(12) United States Patent
Taya

(10) Patent No.: US 8,405,783 B2
(45) Date of Patent: Mar. 26, 2013

(54) ELECTRONIC DEVICE, REMOTE CONTROL DEVICE, AND REMOTE CONTROL SYSTEM

(75) Inventor: Takashi Taya, Tokyo (JP)

(73) Assignee: Oki Semiconductor Co., Ltd., Tokyo (JP)

(*) Notice: Subject to any disclaimer, the term of this patent is extended or adjusted under 35 U.S.C. 154(b) by 836 days.

(21) Appl. No.: 12/272,099

(22) Filed: Nov. 17, 2008

(65) Prior Publication Data

US 2009/0128714 A1 May 21, 2009

(30) Foreign Application Priority Data

Nov. 16, 2007 (JP) ................................. 2007-297773

(51) Int. Cl.
H04N 5/44 (2011.01)
H04N 5/63 (2006.01)

(52) U.S. Cl. ........................ 348/734; 348/730

(58) Field of Classification Search .......... 348/705–706, 348/730, 734; 386/234, 277; 340/10, 693.1, 340/693.3; 345/211
See application file for complete search history.

(56) References Cited

U.S. PATENT DOCUMENTS

| 4,959,810 | A | * | 9/1990 | Darbee et al. ................. 398/112 |
| 5,136,397 | A | * | 8/1992 | Miyashita ..................... 348/748 |
| 5,479,219 | A | * | 12/1995 | Aihara .......................... 348/730 |
| 5,554,980 | A | * | 9/1996 | Hashimoto et al. ........... 345/158 |
| 5,745,105 | A | * | 4/1998 | Kim .............................. 345/212 |
| 5,831,593 | A | * | 11/1998 | Rutledge ....................... 345/156 |
| 6,097,441 | A | * | 8/2000 | Allport .......................... 348/552 |
| 6,205,318 | B1 | * | 3/2001 | Schindler et al. ............ 455/3.06 |
| 6,292,233 | B1 | * | 9/2001 | Erba et al. .................... 348/730 |
| 6,346,891 | B1 | * | 2/2002 | Feinleib et al. .............. 340/12.3 |
| 6,426,887 | B2 | * | 7/2002 | Nagai et al. .................... 363/78 |
| 6,496,122 | B2 | * | 12/2002 | Sampsell ..................... 340/4.42 |
| 6,704,063 | B1 | * | 3/2004 | Van Der Wulp ............. 348/734 |
| 7,233,316 | B2 | * | 6/2007 | Smith et al. .................. 345/157 |
| 7,411,631 | B1 | * | 8/2008 | Joshi et al. ................... 348/734 |
| 7,444,530 | B2 | * | 10/2008 | Deppe et al. ................. 713/323 |
| 7,696,898 | B2 | * | 4/2010 | Funaki ......................... 340/4.3 |
| 7,777,649 | B1 | * | 8/2010 | De Ruyter et al. ............. 341/20 |
| 7,788,507 | B2 | * | 8/2010 | Miyamoto ................... 713/300 |
| 2005/0168372 | A1 | * | 8/2005 | Hollemans ................... 341/176 |
| 2005/0278557 | A1 | * | 12/2005 | Asoh et al. ................... 713/300 |
| 2007/0054651 | A1 | * | 3/2007 | Farmer et al. ................ 455/352 |
| 2007/0139569 | A1 | * | 6/2007 | Matsubayashi .............. 348/734 |
| 2009/0041438 | A1 | * | 2/2009 | Kuno ........................... 386/126 |
| 2010/0033424 | A1 | * | 2/2010 | Kabasawa et al. ........... 345/156 |
| 2011/0211131 | A1 | * | 9/2011 | Kikuchi et al. .............. 348/734 |

* cited by examiner

Primary Examiner — Brian Yenke
(74) Attorney, Agent, or Firm — Volentine & Whitt, PLLC

(57) ABSTRACT

An electronic device includes a wireless receiving circuit for receiving signals transmitted from a remote control unit, a core circuit having a digital signal processing circuit for processing input signals and configured to perform at least one of display processing and record processing based on signals processed in the digital signal processing circuit in accordance with a control signal transmitted from the remote control unit and received by the wireless receiving circuit, and a preliminary activation circuit for starting electric power supply to the digital signal processing circuit to thereby activate the digital signal processing circuit when a pre-operation state where the remote control unit is expected to be operated during stoppage of electric power supply to the core circuit has occurred.

11 Claims, 14 Drawing Sheets

ELECTRONIC DEVICE, REMOTE CONTROL DEVICE, AND REMOTE CONTROL SYSTEM

BACKGROUND OF THE INVENTION

1. Field of the Invention

The present invention relates to an electronic device, a remote control device capable of remotely controlling an electronic device, and a remote control system including an electronic device and a remote control device.

2. Description of the Related Art

In a remote control system, in response to the manipulation of user-operated keys or buttons of a remote control device, a control signal (e.g., infrared rays, radio waves, etc.) is transmitted from the remote control device to an electronic device (e.g., a television) to thereby control an operation of the electronic device.

Generally, it takes time to fully activate an electronic device from a turned-off state. For example, in an older television, time is required to sufficiently heat a cathode-ray tube. Further, in more modern televisions having a liquid crystal panel or plasma panel, time is expended to initialize a signal processing circuit.

In an effort to reduce activation time, a technique has been suggested in which a turn-on process is automatically triggered upon detecting that a remote control unit has been tilted (picked up), i.e., before the user has actually pushed any buttons. See, for example, Japanese Patent Application Laid-Open No. 2007-088753. However, this technique results in relatively poor efficiency since circuits having a short activation time are activated simultaneously with the circuits having a long activation time. Also, electric power is needlessly consumed if a long period of time occurs between activation and actually operation of the remote control unit.

Moreover, when a radio wave is used as transmitting medium of the remote control device, the standby power consumption of a wireless transmitting/receiving circuit for transmitting/receiving the radio wave is problematic. That is, particularly when the wireless transmitting/receiving circuit is set to a continuous reception state during a standby mode, the standby power consumption increases. An intermittent operating mode may be adopted to decrease standby power, but this results in an increase in average delay time to fully turn-on the electronic device.

SUMMARY OF THE INVENTION

Therefore, it is an object of the present invention to provide an electronic device, a remote control device and a remote control system, capable of reducing a time required until the electronic device starts its operation after a control signal was transmitted from the remote control device, while suppressing power consumption.

In order to attain the object, in accordance with a first aspect of the present invention, there is provided an electronic device comprising: receiving circuit for receiving signals transmitted from a remote control device; an electronic device body having a signal processor for processing input signals and configured to perform at least one of display processing and record processing based on signals processed in the signal processing portion in accordance with a control signal transmitted from the remote control device and received by the receiving circuit; and activation circuit for starting electric power supply to the signal processor to thereby activate the signal processor when a pre-operation state where the remote control device is expected to be operated during stoppage of electric power supply to the electronic device body has occurred.

Since the signal processor for processing signals for display processing or recording processing requires a long time for an initialization process, it takes a long time until it enters into an operable state upon power-on. Therefore, by activating the signal processor, which requires a long activation time, when the pre-operation state has been occurred, it is possible to reduce a time required until the electronic device body enters into a state where it is actually operable after it has received the control signal transmitted from the remote control device. Moreover, since a portion that is preliminarily activated is the signal processor that requires a long activation time while portions of the electronic device body, which do not require a long activation time, are maintained in a power saving mode, it is possible to suppress power consumption.

The pre-operation state refers to a state where the remote control device is not operated, that is, a state where the remote control device is expected to operate. For example, a variety of states can be exemplified, including a state where the remote control device is moved, a state where an operator touches the remote control device, and the like.

The display processing may be display processing for generating a video signal from signals received from an external source to thereby display the video signal, or may be display processing for generating a video signal from signals recorded on a recording medium to thereby display (reproduce) the video signal.

In accordance with a second aspect of the present invention, there is provided an electronic device comprising: receiving circuit for receiving signals from a remote control device; an electronic device body configured to operate in accordance with a control signal transmitted from the remote control device and received by the receiving circuit; and switching circuit for switching the receiving circuit to a first intermittent reception state where signals are received at a predetermined time interval when the electric power supply to the electronic device body is stopped while switching the receiving circuit to a second intermittent reception state where signals are received at a time interval shorter than the predetermined time interval or a continuous reception state when a pre-operation state where the remote control device is expected to be operated during stoppage of electric power supply to the electronic device body has occurred.

When the receiving circuit is set to a continuous reception state during a standby mode, standby power consumption increases. On the other hand, when the receiving circuit is set to an intermittent reception state with a long reception interval, though average standby power consumption decreases, the responsiveness of an electronic device to a control signal transmitted from the remote control device deteriorates. In this regard, in accordance with the second aspect of the present invention, the receiving circuit is maintained at the first intermittent reception state where signals are received at a predetermined interval until the pre-operation state occurs during stoppage of electric power supply to the electronic device body while the receiving circuit is switched to the second intermittent reception state, where signals are received at an interval shorter than that of the first intermittent reception state, or the continuous reception state when the pre-operation state has occurred. Therefore, it is possible to reduce a time required until the electronic device starts its operation after a control signal was transmitted from the remote control device, while taking advantage of power saving effect.

In accordance with a third aspect of the present invention, there is provided a remote control device comprising: operation circuit for being operated to transmit a control signal capable of remotely controlling at least one of a first electronic device and a second electrical connector, wherein the first electronic device comprises: first receiving circuit for receiving signals transmitted from a remote control device; a first electronic device body having a signal processor for processing input signals and configured to perform at least one of display processing and record processing based on signals processed in the signal processor in accordance with a control signal transmitted from the remote control device and received by the first receiving circuit; and activation circuit for starting electric power supply to the signal processor to thereby activate the signal processor when a pre-operation state detection signal capable of informing occurrence of a pre-operation state where the remote control device is expected to be operated during stoppage of electric power supply to the first electronic device body has been received by the first receiving circuit, and wherein the second electronic device comprises: second receiving circuit for receiving signals from a remote control device; a second electronic device body configured to operate in accordance with a control signal transmitted from the remote control device and the second receiving circuit; and switching circuit for switching the second receiving circuit to a first intermittent reception state where signals are received at a predetermined time interval when the electric power supply to the second electronic device body is stopped while switching the second receiving circuit to a second intermittent reception state where signals are received at a time interval shorter than the predetermined time interval or a continuous reception state when a pre-operation state detection signal capable of informing occurrence of a pre-operation state where the remote control device is expected to be operated during stoppage of electric power supply to the second electronic device body has been received by the second receiving circuit; detection circuit for detecting the occurrence of the pre-operation state where the operation circuit is expected to be operated by detecting a predetermined physical quantity; and transmitting circuit for transmitting the control signal when the operation circuit is operated while transmitting the pre-operation state detection signal when the occurrence of the pre-operation state has been detected by the detection circuit.

In the above aspect of the present invention, the remote control device is configured to detect occurrence of the pre-operation state to thereby transmit the pre-operation state detection signal. Moreover, the first electronic device is configured to activate the signal processor when the pre-operation state detection signal is received, while the second electronic device is configured to switch the second receiving circuit to the second intermittent reception state (high-frequency intermittent reception state) or the continuous reception state when the pre-operation state detection signal is received. Therefore, it is possible to reduce a time required until at least one of the first electronic device and the second electronic device starts its operation after a control signal was transmitted from the remote control device, while suppressing power consumption.

In accordance with a fourth aspect of the present invention, there is provided a remote control system comprising: a remote control device including: operation circuit for being operated to transmit a control signal capable of remotely controlling an electronic device, and transmitting circuit for transmitting the control signal when the operation circuit is operated; and an electronic device including: receiving circuit for receiving signals transmitted from a remote control device; an electronic device body having a signal processor for processing input signals and configured to perform at least one of display processing and record processing based on signals processed in the signal processor in accordance with a control signal transmitted from the remote control device and received by the receiving circuit; and activation circuit for starting electric power supply to the signal processor to thereby activate the signal processor when a pre-operation state where the remote control device is expected to be operated during stoppage of electric power supply to the electronic device body has occurred.

Since the electronic device of the remote control system according to the above aspect of the present invention performs the same operation as the electronic device according to the first aspect of the present invention, it is possible to reduce a time required until the electronic device starts its operation after a control signal was transmitted from the remote control device, while suppressing power consumption.

In accordance with a fifth aspect of the present invention, there is provided a remote control system comprising: a remote control device including: operation circuit for being operated to transmit a control signal capable of remotely controlling an electronic device, and transmitting circuit for transmitting the control signal when the operation circuit is operated; and an electronic device including: receiving circuit for receiving signals transmitted from a remote control device, an electronic device body configured to operate in accordance with a control signal transmitted from the remote control device and received by the receiving circuit, and switching circuit for switching the receiving circuit to a first intermittent reception state where signals are received at a predetermined time interval when the electric power supply to the electronic device body is stopped while switching the receiving circuit to a second intermittent reception state where signals are received at a time interval shorter than the predetermined time interval or a continuous reception state when a pre-operation state where the operation circuit of the remote control device is expected to be operated during stoppage of electric power supply to the electronic device body has occurred.

Since the electronic device of the remote control system according to the above aspect of the present invention performs the same operation as the electronic device according to the second aspect of the present invention, it is possible to reduce a time required until the electronic device starts its operation after a control signal was transmitted from the remote control device, while suppressing power consumption.

In accordance with the above-mentioned diverse aspects of the present invention, it is possible to provide an advantage of reducing a time required until the electronic device starts its operation after a control signal was transmitted from the remote control device, while suppressing power consumption.

BRIEF DESCRIPTION OF THE DRAWINGS

The above and other aspect and features of the present invention will become readily apparent from the detailed description that follows, with reference to the accompanying drawings, in which.

DESCRIPTION OF THE PREFERRED EMBODIMENTS

The present invention will now be described by way of preferred, but non-limiting, embodiments of the invention. It will be understood that the invention is not limited to the specific examples represented by these embodiments.

As is customary in the field of the present invention, functional block diagrams are presented representing various aspects of the embodiments. It will be understood that the functional block are physically implemented by programmable and/or non-programmable electronic circuits. Further, two or more functional blocks can be physically combined into more complex electronic circuits.

Figure 1:
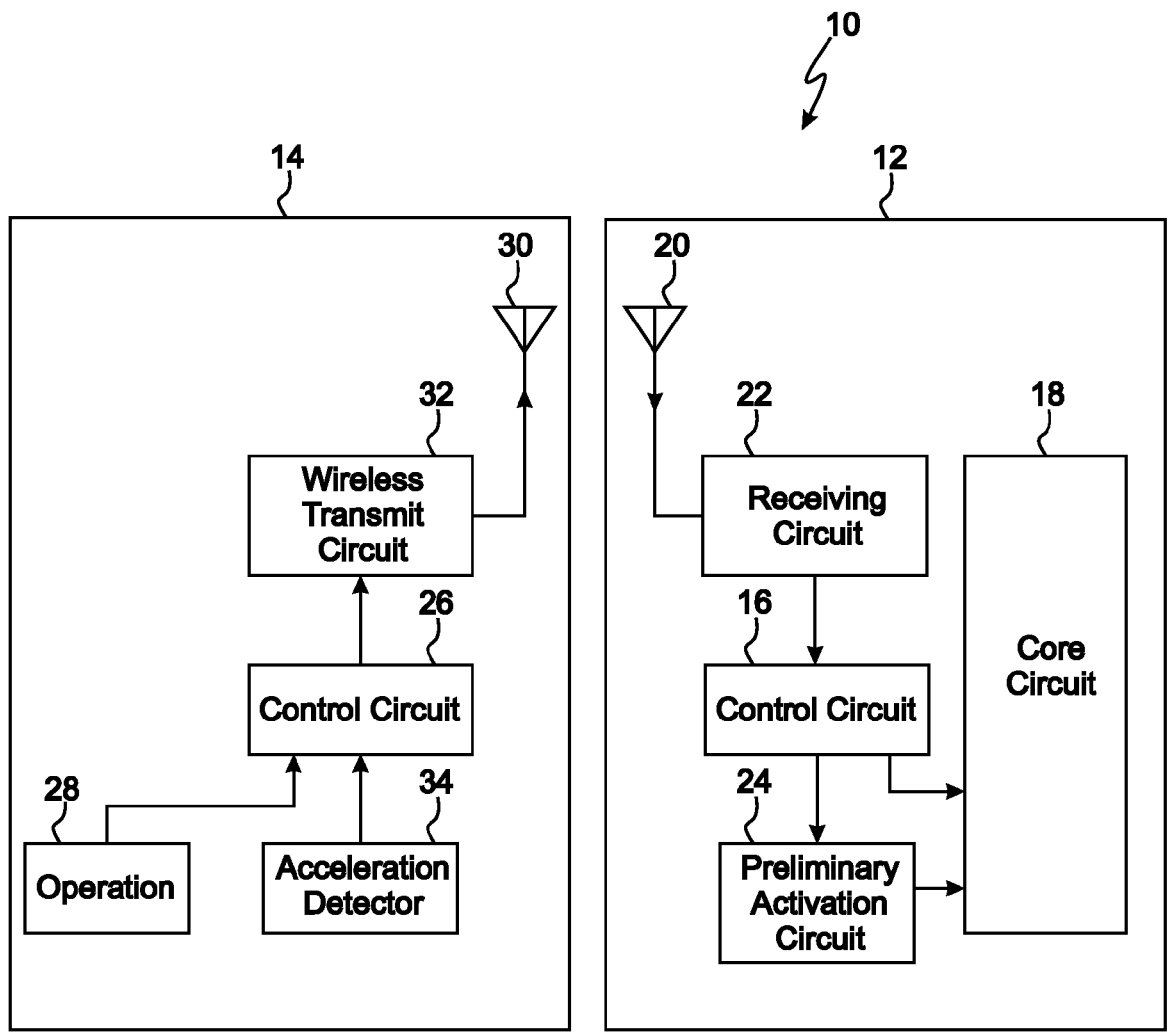
FIG. 1 is a block diagram of a remote control system according to a first embodiment of the present invention.

FIG. 1 is a block diagram of a remote control system 10 according to a first embodiment of the present invention. As shown, the remote control system 10 includes an electronic device 12 and a remote control unit 14.

The electronic device 12 is configured to be remotely controlled by a remote control signal transmitted from the remote control unit 14. The embodiment is not limited by the choice of transmission signal between the electronic device 12 and the remote control unit 14, and examples include infrared ray signals, a radio wave signals, and an acoustic wave signals. In the description that follows, the example is given in which radio wave signals are utilized, for example in a wireless frequency band of 2.4 GHz.

Further, in the present embodiment, unidirectional transmission from the remote control unit 14 to the electronic device 12 is described. However, the embodiment may be implemented in a bidirectional transmission system as well. Further, in the present embodiment, the electronic device 12 is described as being a consumer electronic device such as a television. However, the electronic device 12 is not limited to this example.

The electronic device 12 includes a control circuit 16, a core circuit 18, an antenna 20, a wireless receiving circuit 22, and a preliminary activation circuit 24.

The control circuit 16 controls an overall operation of the electronic device 12. The control circuit 16 is configured to operate the core circuit 18 or the preliminary activation circuit 24 in accordance with a remote control signal transmitted from the remote control unit 14 via the antenna 20 and the wireless receiving circuit 22. The control circuit 16 may be a microcomputer configured by a CPU, a RAM, a ROM, and the like, or may be a digital circuit or the like. In example of the present embodiment, the control circuit 16 will be described as being configured by a microcomputer. A program executed by the control circuit 16 is stored in a storage device such as a ROM, and the CPU executes the program.

The core circuit 18 is operationally activated in accordance with a signal input from the control circuit 16 or the preliminary activation circuit 24.

Figure 2:
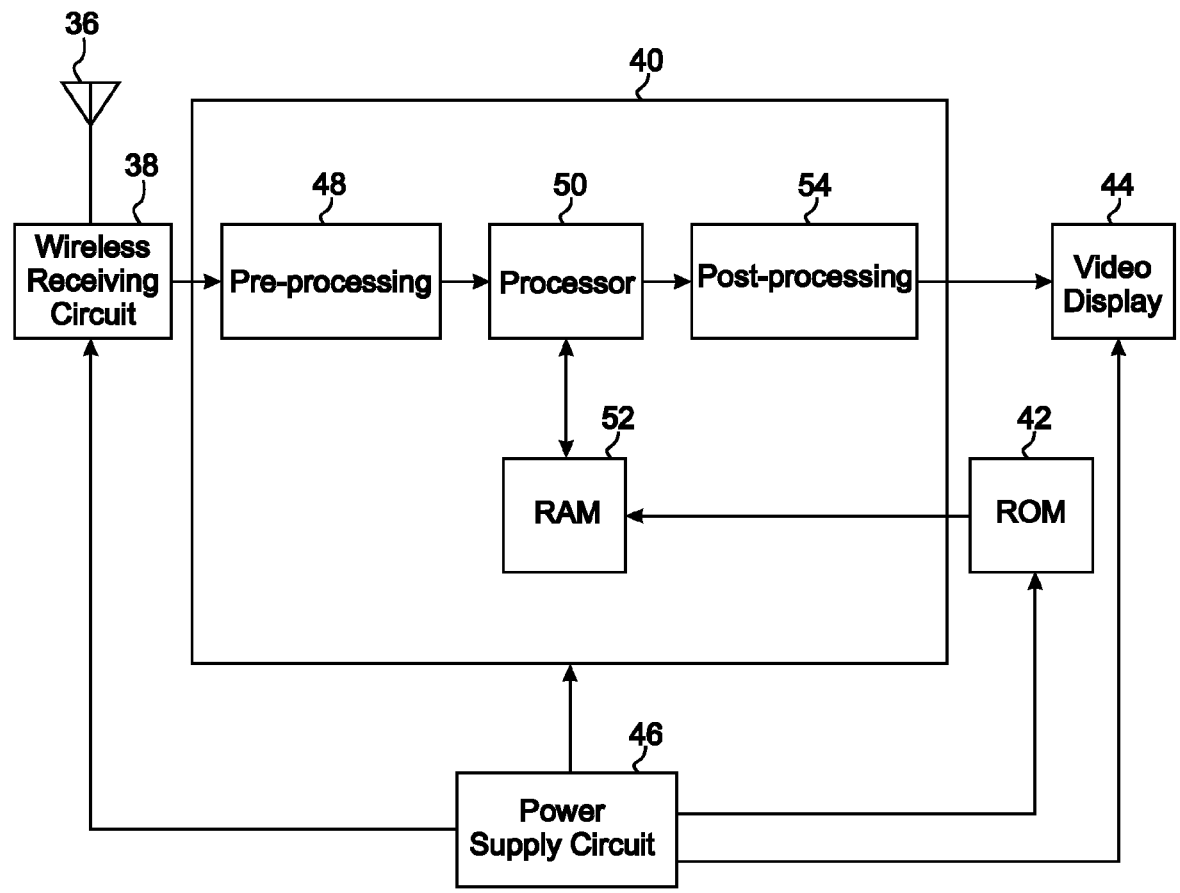
FIG. 2 is a block diagram of a core circuit according to an embodiment of the present invention.

FIG. 2 is a block diagram of an example of the core circuit 18. As illustrated in FIG. 2, the core circuit 18 of this example includes an antenna 36, a wireless receiving circuit 38, a digital signal processing (DSP) circuit 40, a ROM 42, a video display portion 44, and an electric power supply circuit 46.

The antenna 36 is configured to receive a television broadcast signal from an external source, and is distinguished from the antenna 20 receiving the remote control signal. The wireless receiving circuit 38 is configured to convert the television broadcast signal received via the antenna 36 into a digital signal, decode the digital signal, and input the decoded digital signal to the digital signal processing circuit 40.

Upon receipt of the decoded digital signal from the wireless receiving circuit 38, the digital signal processing circuit 40 applies predetermined signal processing to the digital signal to thereby generate a video signal so as to be displayed by the video display portion 44.

The digital signal processing circuit 40 of this example includes a pre-processing portion 48, a processor 50, a RAM 52, and a post-processing portion 54. The processor 50 is connected to the pre-processing portion 48, the RAM 52, and the post-processing portion 54.

The RAM 52 is connected to the ROM 42. The ROM 42 stores therein a video signal processing program for allowing the processor 50 to execute processing for generating a video signal. The video signal processing program is stored in the RAM 52 upon activation of the electronic device 12 (or the digital signal processing circuit 40). Thereafter, upon completion of preparation of program execution, the digital signal processing circuit 40 enters a state where it is able to perform desired video signal processing (a detailed description will be provided later). The storage medium for storing the program executed by the digital signal processing circuit 40 is not limited to the ROM 42, and may be other storage media may be adopted as long as it is capable of storing therein a program and reading out the stored program. Furthermore, the ROM 42 may be located in the digital signal processing circuit 40.

The pre-processing portion 48 is configured to execute format conversion processing for converting a format based on the decoded digital signal or compression processing, for example, and output processing results.

The processor 50 executes the video signal processing program stored in the RAM 52 to thereby apply predetermined signal processing to the digital signal output from the pre-processing portion 48. Examples of the signal processing executed by the processor 50 include motion vector retrieval processing, interpolation processing, or the like, performed between different video signals (i.e., between previous and subsequent video signals).

The post-processing portion 54 performs scaling (enlarging or reducing) processing, image-quality adjustment processing or the like to the digital signal having subjected to the predetermined signal processing by the processor 50. The digital signal processed by the post-processing portion 54 is input as a video signal to the video display portion 44.

The video display portion 44 is configured to include a display device such as a receiver circuit or a liquid crystal panel and is capable of displaying videos based on the video signal input from the post-processing portion 54.

The electric power supply circuit 46 is configured to supply electric power to each portion of the core circuit 18 in accordance with signals input from the control circuit 16 or the preliminary activation circuit 24.

The antenna 20 of the electronic device 12 is configured to receive the remote control signal transmitted from the remote control unit 14. The remote control signal transmitted via the antenna 20 is decoded by the wireless receiving circuit 22 and input to the control circuit 16. The control circuit 16 performs a variety of controls in accordance with the remote control signal, as described above.

The preliminary activation circuit 24 is connected to the control circuit 16 and the core circuit 18. Upon receipt of the control circuit from the control circuit 16, the preliminary activation circuit 24 outputs an activation signal capable of activating the digital signal processing circuit 40 among the core circuit 18, to the core circuit 18, specifically, to the electric power supply circuit 46 of the core circuit 18.

The video display portion 44 of the core circuit 18 does not require a heating time differently from a traditional cathode-ray tube and is thus activated immediately upon power-on. However, since the digital signal processing circuit 40 requires a long time, upon power-on, for initialization processing such as program storage and execution preparation, as described above, it is a circuit which requires a particularly long activation time among the core circuit 18.

A description of a configuration of the remote control unit 14 will be provided below. The remote control unit 14 for remotely controlling the electronic device 12 includes, for example, a control circuit 26, an operation portion 28, an antenna 30, a wireless transmitting circuit 32, and an acceleration detector 34.

The operation portion 28 has a plurality of buttons including a power button for turning on/off the electronic device 12, a channel button for selecting a desired channel, and a volume button for adjusting a volume. When any button is operated (pressed) by an operator, a signal corresponding to the pressed button is input to the control circuit 26.

The acceleration detector 34 is configured to detect an acceleration of the remote control unit 14. Specifically, the acceleration detector 34 detects the acceleration by detecting a vibration, a tilt or the like of the remote control unit 14, generated when the remote control unit 14 is moved or raised by an operator. Usually, when an operator starts to operate the remote control unit 14, the operator often takes hold of or moves the remote control unit 14. In the present embodiment, when the acceleration detector 34 detects the acceleration, the movement of the remote control unit 14 is detected. That is, the occurrence of a state (pre-operation state) where the remote control unit 14 is expected to start to operate is detected. A signal representing the detected acceleration is input to the control circuit 26. In the present embodiment, as long as the magnitude of the detected acceleration is not 0, the signal is input from the acceleration detector 34 to the control circuit 26.

When the operation portion 28 is operated by an operator and a signal corresponding to a button operation is input to the control circuit 26, the control circuit 26 generates a remote control signal corresponding to the button operation from the input signal and outputs the remote control signal to the wireless transmitting circuit 32. The wireless transmitting circuit 32 modulates the input remote control signal and transmits the modulated remote control signal to the electronic device 12 via the antenna 30.

Moreover, when the acceleration is detected by the acceleration detector 34, the control circuit 26 generates a remote control signal representing the detection of the acceleration and outputs the remote control signal to the wireless transmitting circuit 32. The wireless transmitting circuit 32 modulates the input remote control signal and transmits the modulated remote control signal to the electronic device 12 via the antenna 30.

The control circuit 26 may be a microcomputer configured by a CPU, a RAM, a ROM, and the like, or may be a digital circuit or the like. In the present embodiment, the control circuit 16 will be described as being configured by a microcomputer. A program executed by the control circuit 26 is stored in storage media such as a ROM, and the CPU executes the program.

A description of the operation of the present embodiment will be provided below.

In the present embodiment, the digital signal processing circuit 40 is preliminarily activated at a timing before the power button of the operation portion 28 of the remote control unit 14 is pressed, to thereby reduce the a time required until videos are actually displayed by the electronic device 12 after the power button of the operation portion 28 of the remote control unit 14 is pressed.

A description of an operation of the remote control system 10 according to the present embodiment will be provided based on the following assumption, for the simplicity's sake. First, only the power button is operated among the plurality of buttons of the operation portion 28. Second, the remote control signal transmitted upon operation of the operation portion 28 includes only two signals: the activation signal capable of activating, by turning on, the core circuit 18 of the electronic device 12 (that is, a signal capable of allowing electric power supply to the core circuit 18 of the electronic device 12); and a stop signal capable of stopping, by turning off, the core circuit 18 (that is, a signal capable of inhibiting electric power supply to the core circuit 18). Moreover, in the following description, the remote control signal transmitted upon detection of the acceleration by the remote control unit 14 will be referred to as a pre-operation state detection signal.

In the remote control unit 14, when the movement or vibration of the remote control unit 14 is detected by the acceleration detector 34, the control circuit 26 transmits the pre-operation state detection signal via the wireless transmitting circuit 32 and the antenna 30, as described above. Moreover, in the remote control unit 14, when the power button of the operation portion 28 is pressed, the control circuit 26 transmits the remote control signal (the activation signal or the stop signal) corresponding to the button operation via the wireless transmitting circuit 32 and the antenna 30.

A description of the operation of the electronic device 12 will be provided below with reference to FIGS. 3 and 4.

Figure 3:
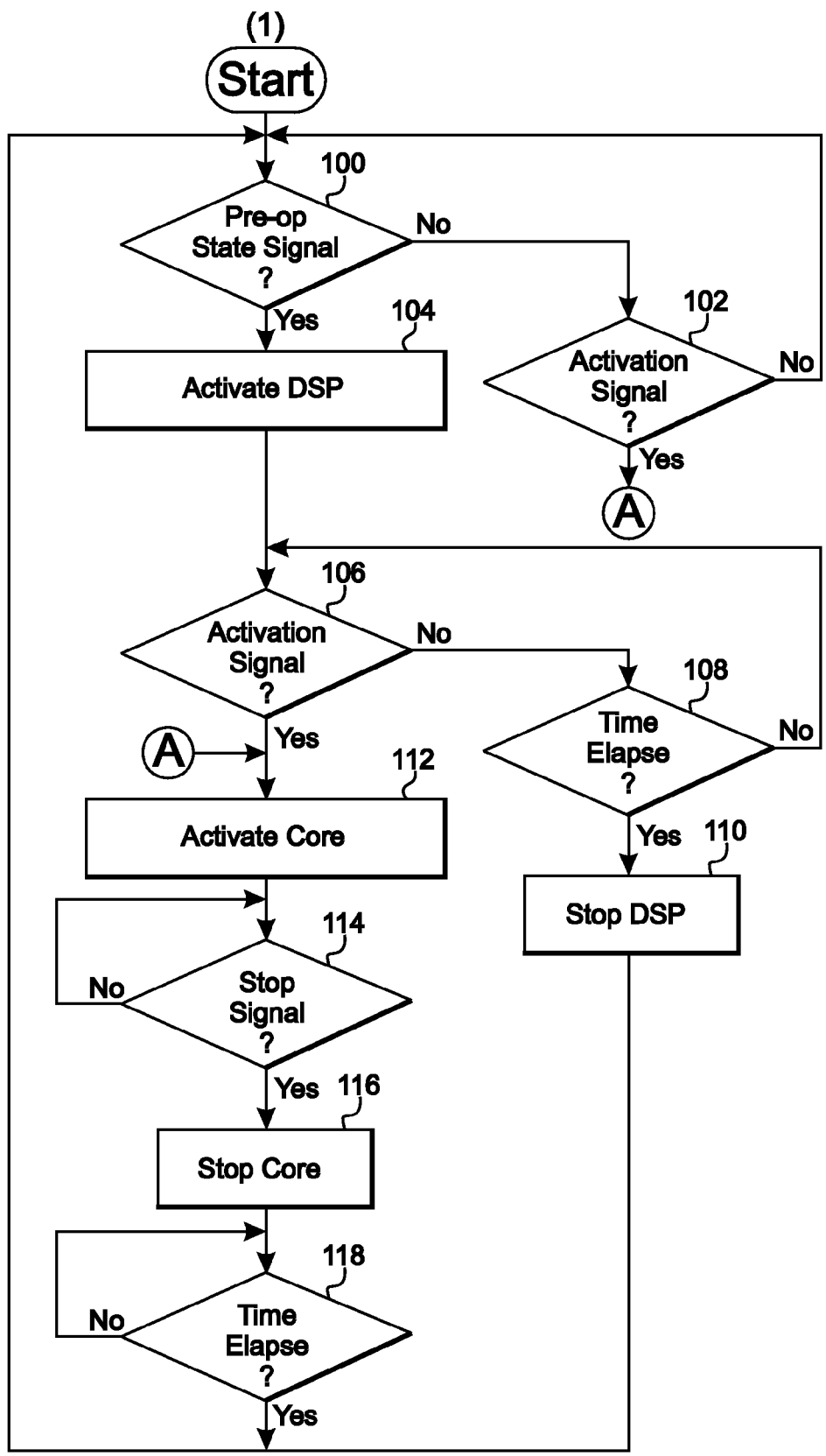
FIG. 3 is a flow chart illustrating a procedure of a preliminary activation process performed by a control circuit of an electronic device according to the first embodiment.

FIG. 3 is a flow chart illustrating a procedure of a preliminary activation process performed by the control circuit 16 of the electronic device 12 according to the first embodiment. As described above, a program for the preliminary activation process is preliminarily stored in storage media such as the ROM or the like of the control circuit 16, and the CPU of the control circuit 16 executes the program. FIG. 4 is a state transition diagram of the electronic device 12.

Figure 4:
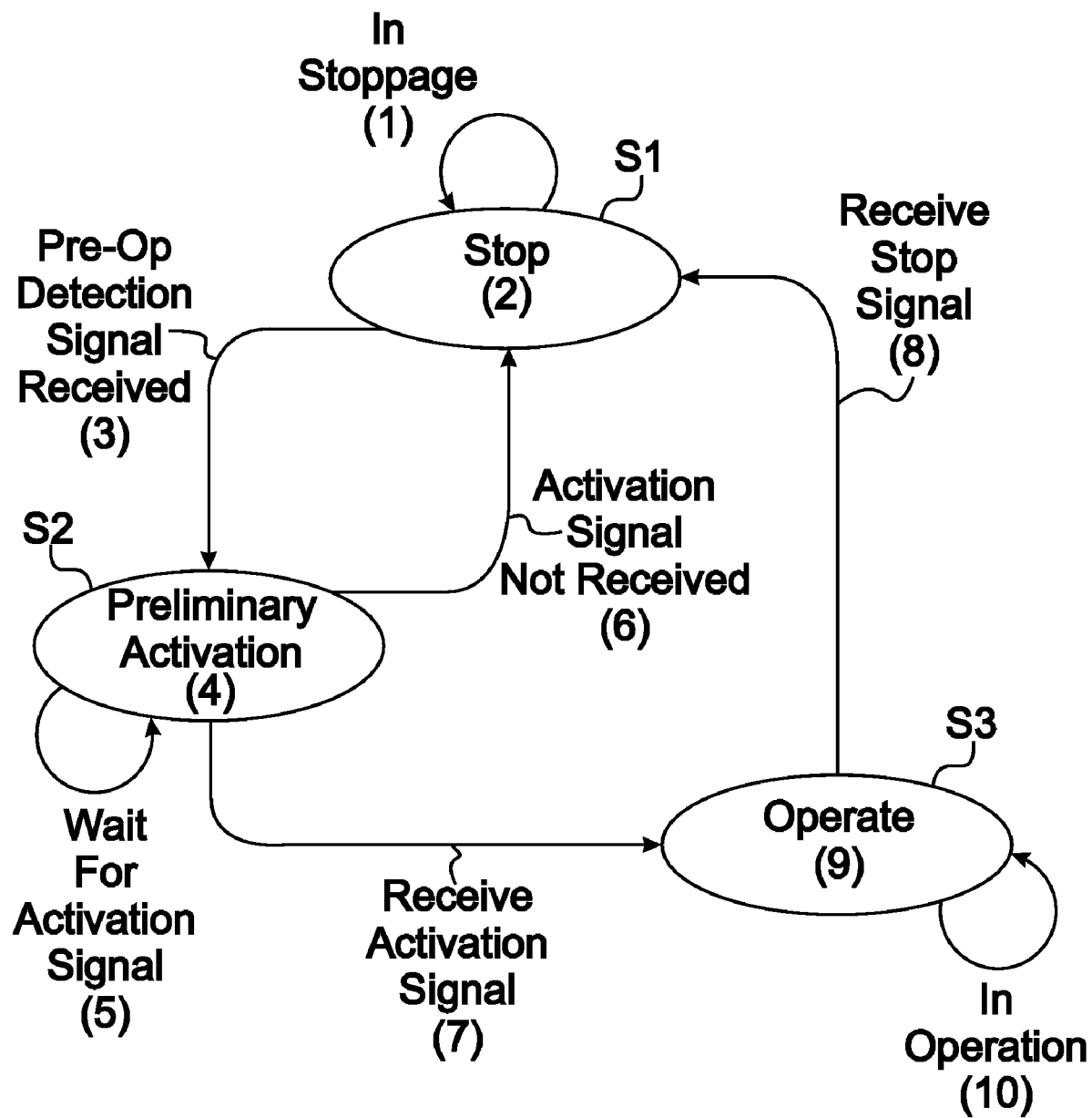
FIG. 4 is a state transition diagram of the electronic device according to the first embodiment.

In the present embodiment, in a state before the activation signal is transmitted from the remote control unit 14 in a state where a main power of the electronic device 12 is turned on, the electric power supply to the control circuit 16, the wireless receiving circuit 22, and the preliminary activation circuit 24 is maintained while the electric power supply to the core circuit 18 is stopped (see S1 in FIG. 4).

In this state, the control circuit 16 determines in step 100 of FIG. 3 whether or not the pre-operation state detection signal has been received from the remote control unit 14. When a determination result in step 100 is negative, the control circuit 16 determines in step 102 whether or not the activation signal has been received from the remote control unit 14. When a determination result in step 102 is negative, the flow returns to step 100 and a waiting state is maintained. In FIG. 4, the S1 state (STOP) is maintained.

When it is determined in step 100 that the pre-operation state detection signal has been received, the control circuit 16 activates in step 104 the digital signal processing circuit 40 of the core circuit 18. Specifically, the control circuit 16 transmits a control signal to cause the preliminary activation circuit 24 to output the activation signal. Upon receipt of the control signal from the control circuit 16, the preliminary activation circuit 24 outputs the activation signal to the electric power supply circuit 46 of the core circuit 18. Upon receipt of the activation signal from the preliminary activation circuit 24, the electric power supply circuit 46 is immediately activated to supply electric power to the digital signal processing circuit 40 and the ROM 42 storing therein a program necessary for activation of the digital signal processing circuit 40 to thereby activate the digital signal processing circuit 40. When the necessary program is loaded from the ROM 42 to the RAM 52, the electric power supply circuit 46 stops the electric power supply to the ROM 42. The ROM 42 may be provided within the digital signal processing circuit 40.

By the processing of step 104, the electronic device 12 transitions to a preliminary activation state. In FIG. 4, the state transitions from state S1 to state S2 (PRELIMINARY ACTIVATION).

In step 106, the control circuit 16 determines whether or not the activation signal (a signal capable of allowing the electric power supply to the core circuit 18) has been received from the remote control unit 14. When a determination result in step 106 is negative, the flow proceeds to step 108, where the control circuit 16 determines whether or not a predetermined time has elapsed after the electronic device 12 has transitioned to the preliminary activation state. When the control circuit 16 has determined in step 108 that the predetermined time has not elapsed, the flow returns to step 106 and a waiting state is maintained.

When the control circuit 16 has determined in step 106 that the activation signal has been received from the remote control unit 14, the flow proceeds to step 112, where the control circuit 16 activates the entire portions of the core circuit 18. Specifically, the control circuit 16 outputs an activation control signal capable of activating the entire portions of the core circuit 18, to the electric power supply circuit 46 of the core circuit 18. Upon receipt of the activation control signal from the control circuit 16, the electric power supply circuit 46 starts the electric power supply to the entire portions of the core circuit 18 to thereby activate the entire portions of the core circuit 18. In FIG. 4, the state transitions from state S2 to state S3 (OPERATE).

Meanwhile, when the control circuit 16 has determined in step 102 that the activation signal has received from the remote control unit 14, the flow proceeds to step 112 in a manner similar to that previously described, where the control circuit 16 activates the entire portions of the core circuit 18. In this way, the state transitions from state S1 directly to state S3 in FIG. 4.

More specifically, in the processing of step 112 executed after it has been determined in step 106 that the activation signal has been received, since the electronic device 12 is in the preliminary activation state, the digital signal processing circuit 40 is already activated at this time point. For this reason, the electric power supply circuit 46 starts the electric power supply to other portions of the core circuit 18 to thereby activate the portions while maintaining the electric power supply to the digital signal processing circuit 40. Moreover, in the processing of step 112 executed after it has been determined in step 102 that the activation signal has been received, since the entire portions of the core circuit 18 are in a stop state, the electric power supply circuit 46 starts the electric power supply to the entire portions of the core circuit 18 including the digital signal processing circuit 40 to thereby activate the entire portions.

In steps subsequent to step 112, since the entire portions of the core circuit 18 are activated, the core circuit 18 enters into an operation state where if the electronic device 12 is a television, a received television signal is processed and a video display operation is started.

After the core circuit 18 is activated, the flow proceeds to step 114, where it waits for receipt of the stop signal. When the control circuit 16 has determined in step 114 that the stop signal has been received from the remote control unit 14, the control circuit 16 outputs in step 116 a stop control signal to the electric power supply circuit 46. With the stop control signal, the electric power supply circuit 46 stops the electric power supply to the core circuit 18. In FIG. 4, the state returns from S3 to S1. For example, if the electronic device 12 is a television, the video display operation is finished and power is turned off.

In the present embodiment, the electronic device 12 transitions to a stop state in step 116, and thereafter, the flow returns to step 100 after elapse of a predetermined time (a short time of about 1 to 2 seconds) in step 118. This is because it is highly likely that the acceleration detected immediately after the stop signal is transmitted from the remote control unit 14 is not based on the movement detected when an operator starts to operate the remote control unit 14, but based on the movement detected upon completion of the remote control operation. Moreover, it may be configured such that the pre-operation state detection signal is not transmitted immediately after the stop signal has been transmitted from the remote control unit 14, and in such a case, the processing of step 118 may be omitted.

Meanwhile, when a state where the activation signal (a signal capable of allowing the electric power supply to the core circuit 18) by the button operation of the operation portion 28 is not received, continues for a predetermined time (for example, 20 seconds) in the preliminary activation state, a determination result in step 108 is negative and the flow proceeds to step 110. In step 110, the control circuit 16 outputs a control signal for releasing the preliminary activation state to the preliminary activation circuit 24. Upon receipt of the control signal, the preliminary activation circuit 24 outputs a preliminary activation stop signal to the electric power supply circuit 46 of the core circuit 18. Upon receipt of the preliminary activation stop signal from the preliminary activation circuit 24, the electric power supply circuit 46 stops the electric power supply to the digital signal processing circuit 40 to thereby release the preliminary activation state. With this operation, the entire portions of the core circuit 18 return to a stop state. In FIG. 4, the state returns from S2 to S1.

As described above, according to the present embodiment, the remote control unit 14 detects an acceleration to thereby detect the occurrence of the pre-operation state, so that the digital signal processing circuit 40 among the core circuit 18 of the electronic device 12, which requires a long time for activation (preparation (initialization processing) for execution of a video signal processing program or the like), is preliminarily activated. Therefore, it is possible to reduce a time required until the core circuit 18 starts operating after the power button of the operation portion 28 has been actually pressed by an operator.

For example, in the conventional art, videos are displayed a short time after the power button of the operation portion 28 of the remote control unit 14 has been pressed. However, in the present invention, since videos are immediately displayed when an operator raises the remote control unit 14 and presses the power button of the operation portion 28, the operator may have a feeling that the electronic device 16 is immediately activated, and thus, good operability can be provided. Moreover, when only circuits which require a long activation time are preliminarily activated, it is possible to suppress an increase in power consumption.

Moreover, in the preliminary activation state, since only a circuit (the digital signal processing circuit 40), which requires a long activation time, is activated rather than activating the entire portions of the core circuit 18, it is possible to take advantage of power saving effect.

In addition, in the present embodiment, although it is configured to detect the acceleration by using the acceleration detector 34 to thereby detect the occurrence of the pre-operation state where the remote control unit 14 is expected to operate, the present invention is not limited to such a configuration. For example, it may be configured to detect a change in gravity or to detect a change in direction of gravity by using a gravity sensor to thereby detect the occurrence of the pre-operation state.

Moreover, it may be configured to detect blocking of light by using an optical sensor to thereby detect that an operator has taken hold of the remote control unit 14. For example, micro-pores are formed in a casing of the remote control unit 14, so that outside light can be incident to an internal optical sensor. Since pores formed at a portion of the remote control unit 14 corresponding to a portion which is held by an operator, are covered by the operator's hand, light is blocked at the portion corresponding to the pores. Such blocking of light is detected by the optical sensor, and thus, the occurrence of the pre-operation state is detected.

Furthermore, a sensor capable of detecting brightness around the remote control unit 14 may be provided so as to detect the occurrence of the pre-operation state. When the surrounding area is darkened, it is highly likely that an operator is not present around the remote control unit 14, and thus, the remote control unit 14 is not likely to be operated. However, when the surrounding area is bright, it is highly likely that the remote control unit 14 is operated and the electronic device 12 is activated. Therefore, the occurrence of the pre-operation state can be detected by detecting ambient brightness.

Moreover, it may be configured to detect a change in geomagnetism by using a geomagnetic sensor incorporating a plurality of magnetic sensors to thereby detect the occurrence of the pre-operation state.

Furthermore, it may be configured to detect ambient sound to thereby detect the occurrence of the pre-operation state. This is to detect sound generated when an operator moves or talks, for example, to thereby detect the presence of the operator around the remote control unit 14. To the contrary, when no sound is detected, it is highly likely that an operator is not present around the remote control unit 14, and therefore, the remote control unit 14 is not likely to be operated. Therefore, the occurrence of the pre-operation state can be detected by detecting sound.

In addition, a sensor capable of detecting contact of an operator with the remote control unit 14 may be provided to the remote control unit 14. Examples of the sensor include a temperature sensor configured to detect a temperature change when the remote control unit 14 is contacted with an operator's hand or fingers, an infrared sensor configured to detect heat emissions from a human body, an electro-resistive sensor configured to detect a contact resistance upon contact of fingers, a pressure sensor configured to detect a pressure change upon contact of a hand, and the like.

Moreover, when it is configured to detect, as the pre-operation state, movement of an operator or the electronic device 12 toward the remote control unit 14, a capacitance sensor may be provided. The capacitance sensor is configured to be able to convert a change in electrostatic capacitance between a detection surface and a detection target to thereby detect the movement of the detection target toward the detection surface.

Furthermore, it may be configured to detect the movement of the operator or the electronic device 12 toward the remote control unit 14 by using an ultrasonic sensor. For example, by measuring a reflection intensity of an ultrasonic wave emitted from the ultrasonic sensor and reflected from the operator, a determination can be made as to whether or not the operator is moving toward the remote control unit 14. Furthermore, when the remote control unit 14 is configured to be able to perform a bi-directional communication with the electronic device 12, a sensor capable of detecting an intensity change of a radio wave transmitted from the electronic device 12 may be provided so that the movement of the electronic device 12 toward the remote control unit 14 can be detected based on a detection result of the sensor.

As described above, although there are a variety of types of sensors capable of detecting the occurrence of the pre-operation state, a plurality of sensors of different types may be provided together so as to detect two or more types of physical quantities.

In the present embodiment, although a description has been made for an example where the operation portion 28 includes a plurality of buttons, the invention is not limited to this. For example, when a sensor provided for detecting the occurrence of the pre-operation state is not configured to detect acceleration, vibration, or the like, the operation portion 28 may be configured to be operated in accordance with an acceleration (such as shaking of the remote control unit 14).

In addition, a display lamp may be provided to the electronic device 12 in order for an operator to know that it has entered into the preliminary activation state, so that the display lamp is lighted upon entering of the preliminary activation state.

Figure 5:
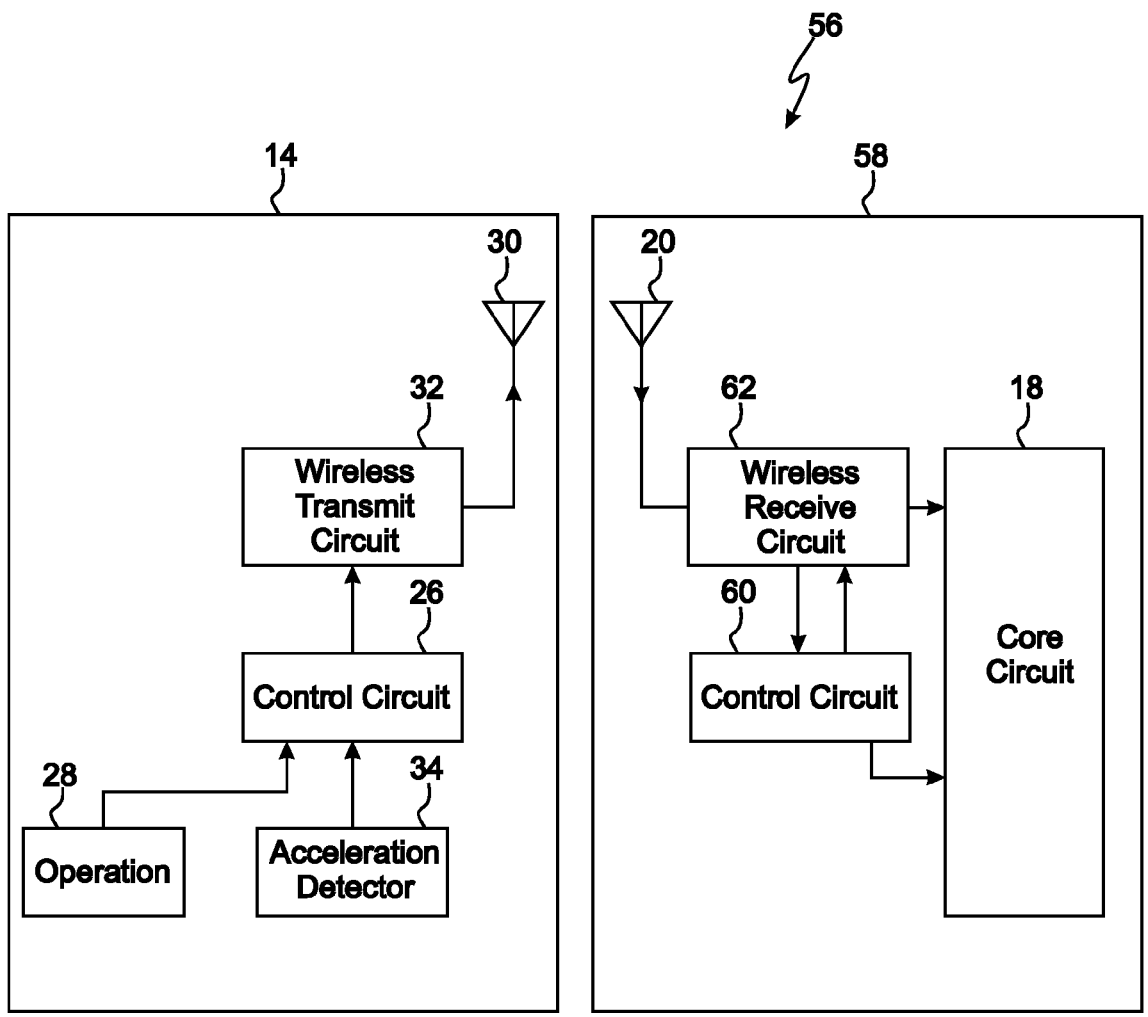
FIG. 5 is a block diagram of a remote control system according to a second embodiment.

FIG. 5 is a configuration diagram of a remote control system 56 according to a second embodiment. The remote control system 56 of the example includes an electronic device 58 and a remote control unit 14. In FIG. 5, components having the same function as those in FIG. 1 are denoted by the same reference numerals as used in FIG. 1, and therefore, redundant descriptions thereof will be omitted.

The electronic device 58 of the present embodiment is configured to operate by being remotely controlled by a remote control signal transmitted from the remote control unit 14, similar to the first embodiment. The electronic device 58 of the present embodiment is configured to include a control circuit 60, a core circuit 18, an antenna 20, and a wireless receiving circuit 62.

The control circuit 60 of the present embodiment controls the overall operation of the electronic device 58. The control circuit 60 is configured to operate the core circuit 18 or to switch a reception state of the wireless receiving circuit 62 in accordance with a remote control signal transmitted from the remote control unit 14 and input thereto via the antenna 20 and the wireless receiving circuit 62. The control circuit 60 may be a microcomputer configured by a CPU, a RAM, a ROM, and the like, or may be a digital circuit or the like. In the present embodiment, the control circuit 16 will be described as being configured by a microcomputer. A program executed by the control circuit 60 is stored in storage circuit such as a ROM, and the CPU executes the program.

The core circuit 18 is operated by being activated in accordance with a signal input from the control circuit 60. Moreover, in the present embodiment, since unlike the first embodiment, the preliminary activation of the digital signal processing circuit 40 of the core circuit 18 is not performed, the preliminary activation circuit 24 capable of performing the preliminary activation is not provided. The electric power supply circuit 46 of the core circuit 18 according to the present embodiment is configured to start the electric power supply to the entire portions of the core circuit 18 to thereby activate the entire portions or to stop the electric power supply, in accordance with a control signal from the control circuit 60.

Figure 6:
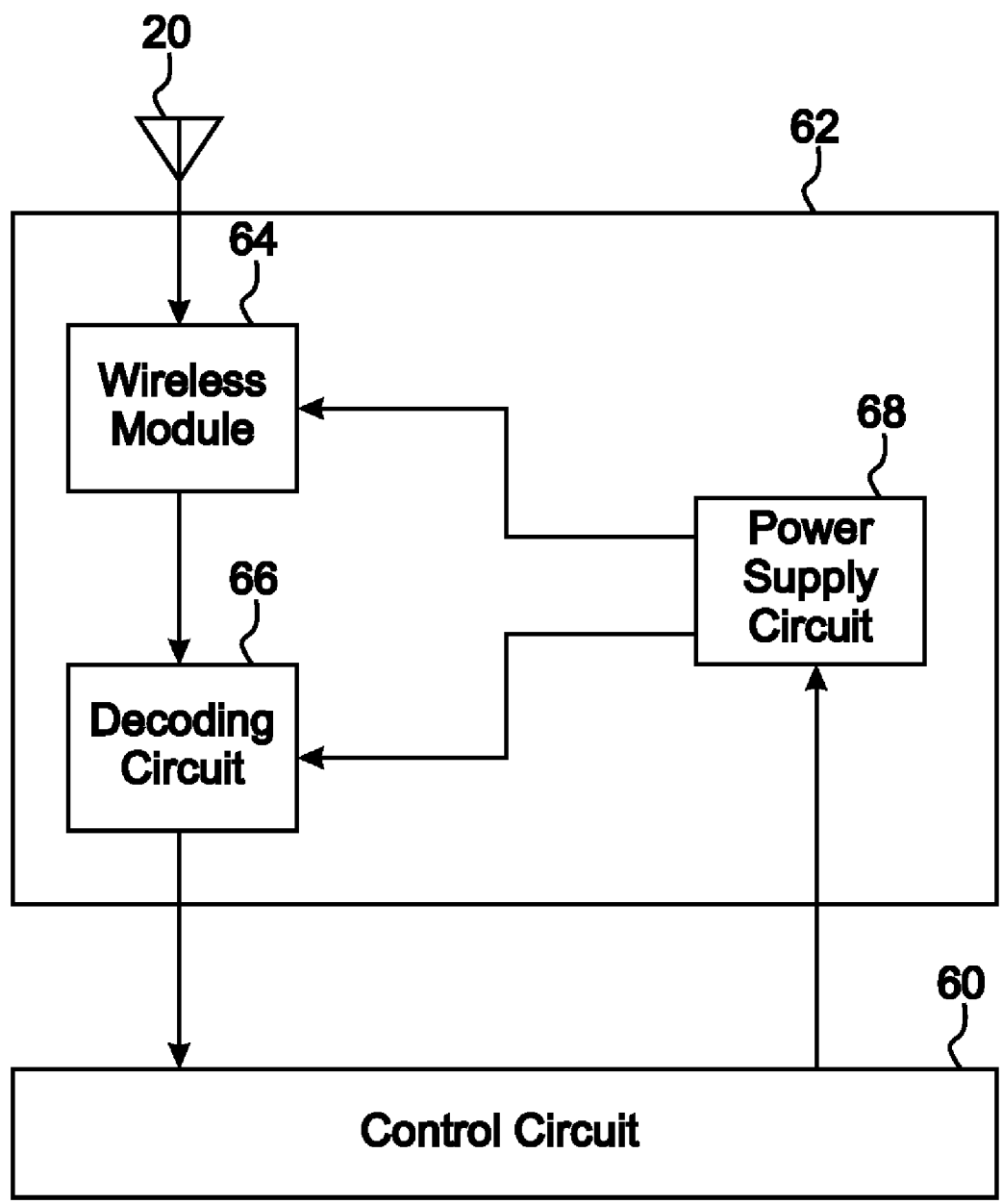
FIG. 6 is a schematic configuration diagram of a wireless receiving circuit.

The wireless receiving circuit 62 of the present embodiment is configured to decode a remote control signal received via the antenna 20 and input the decoded remote control signal to the control circuit 60. FIG. 6 is a schematic configuration diagram of the wireless receiving circuit 62. As illustrated in FIG. 6, the wireless receiving circuit 62 of the present embodiment is configured to include a wireless module 64, a decoding circuit 66, and an electric power supply circuit 68.

The wireless module 64 is configured to perform pre-processing to the remote control signal received from the remote control unit 14 before being decoded by the decoding circuit 66, such as amplification of the remote control signal. The decoding circuit 66 is configured to decode the remote control signal input from the wireless module 64. The electric power supply circuit 68 is configured to adjust an interval of the electric power supply to the wireless module 64 and the decoding circuit 66 and change the reception state of the wireless receiving circuit 62, in accordance with the control signal input from the control circuit 60.

A description of the operation of the present embodiment will be provided below.

In the present embodiment, when the core circuit 18 is in a stop state where it is not activated, the wireless receiving circuit 62 is switched to a low-frequency intermittent reception state (a reception state where a time interval between adjacent reception periods is relatively long) where signals are received at a relatively long time interval. On the other hand, when a pre-operation state, where the remote control unit 14 is expected to be operated, has occurred, the wireless receiving circuit 62 is switched to a high-frequency intermittent reception state (a reception state where a time interval between adjacent reception periods is relatively short) where signals are received at a relatively short time interval, or to a continuous reception state where signals are received continuously.

A description of an operation of the remote control system 56 according to the present embodiment will be provided based on the following assumption, for the simplicity's sake, similar to the first embodiment. First, only the power button is operated among the plurality of buttons of the operation portion 28. Second, the remote control signal transmitted upon operation of the operation portion 28 includes only two signals: an activation signal capable of activating, by turning on, the core circuit 18 of the electronic device 58; and a stop signal capable of stopping, by turning off, the core circuit 18. Moreover, similar to the first embodiment, when the acceleration detector 34 detects the acceleration of the remote control unit 14, the occurrence of a pre-operation state where the remote control unit 14 is expected to start to operate is detected. When the acceleration is detected, the pre-operation state detection signal is transmitted from the remote control unit 14.

Since the remote control unit 14 operates in the same manner as the first embodiment, any further description thereof will be omitted.

Figure 7:
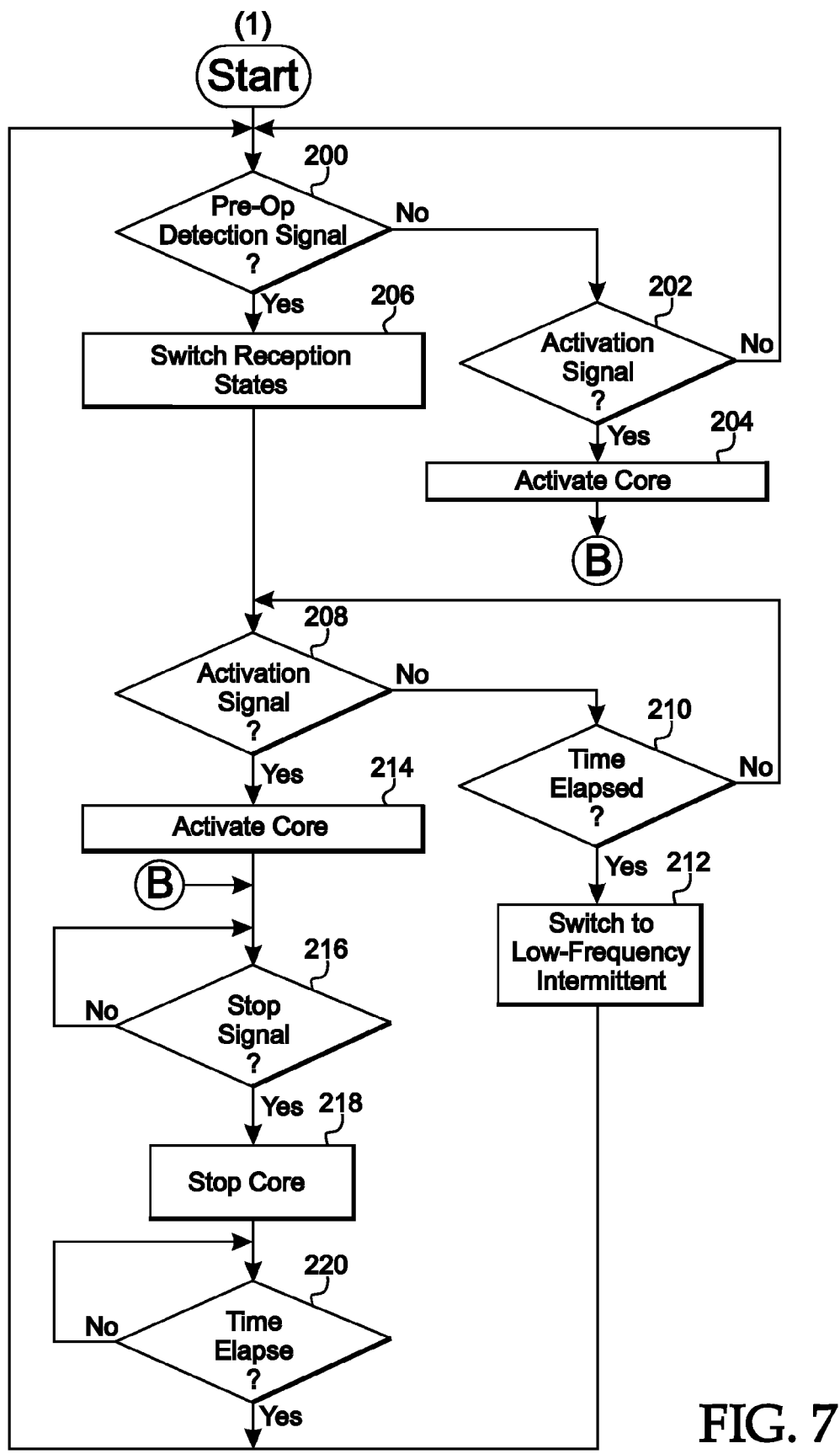
FIG. 7 is a flow chart illustrating a procedure of a reception-state switching process performed by a control circuit of an electronic device according to the second embodiment.
Figure 8:
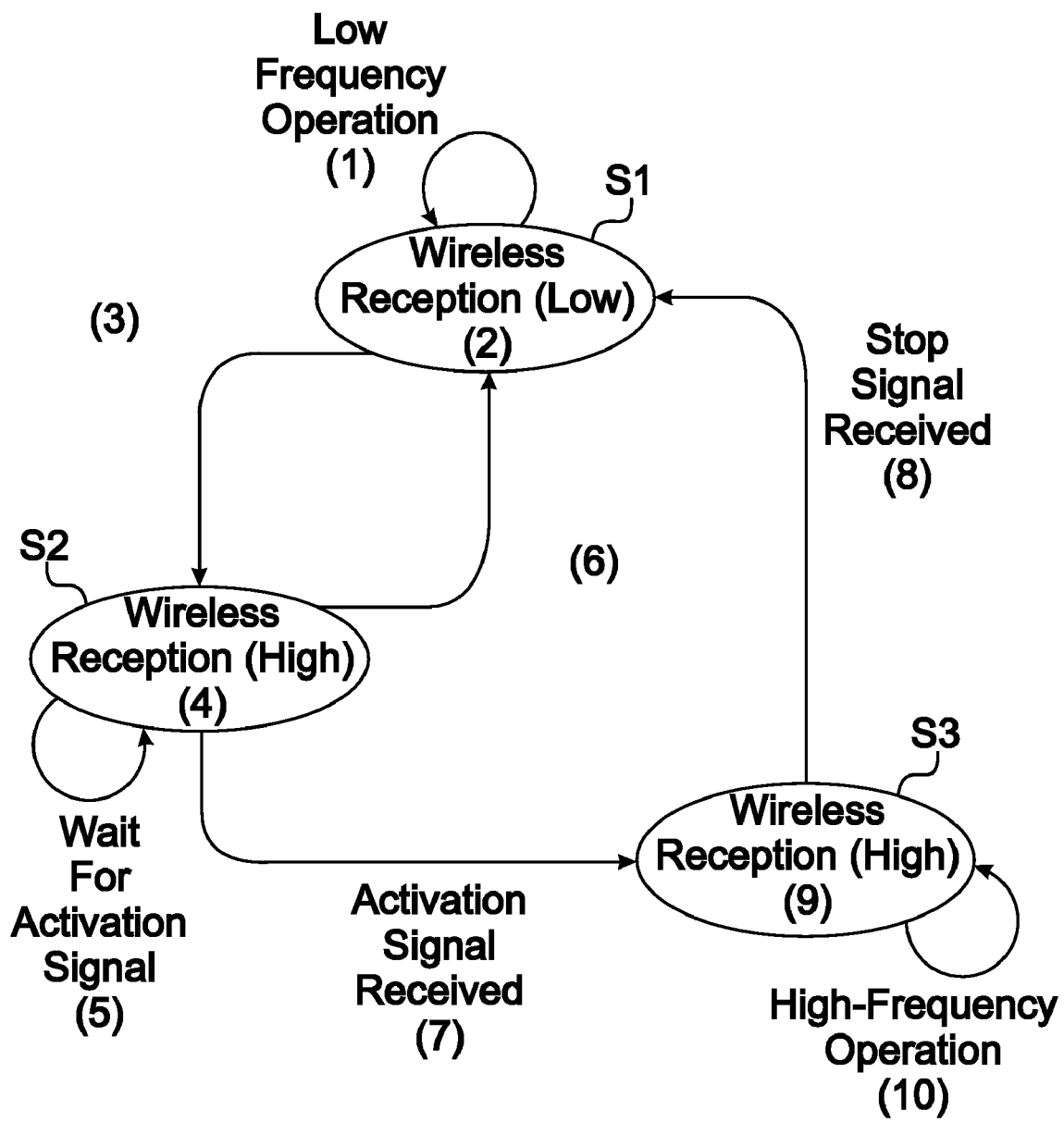
FIG. 8 is a state transition diagram of the electronic device according to the second embodiment.

FIG. 7 is a flow chart illustrating a procedure of a reception-state switching process performed by the control circuit 60 of the electronic device 58 according to the second embodiment. As described above, a program for the reception-state switching process is preliminarily stored in storage circuit such as the ROM or the like of the control circuit 60, and the CPU of the control circuit 60 executes the program. FIG. 8 is a state transition diagram of the electronic device 58.

In the present embodiment, in a stage before the activation signal is transmitted from the remote control unit 14 in a state where a main power of the electronic device 58 is turned on, the electric power supply to the control circuit 60 and the wireless receiving circuit 62 is maintained while the electric power supply to the core circuit 18 is stopped. Moreover, the wireless receiving circuit 62 is receiving the remote control signal from the remote control unit 14 in the low-frequency intermittent reception state (see S1 in FIG. 8).

In this state, the control circuit 60 determines in step 200 of FIG. 7 whether or not the pre-operation state detection signal has been received. When a determination result in step 200 is negative, the control circuit 60 determines in step 202 whether or not the activation signal by the operation of the operation portion 28 of the remote control unit 14 has been received. When a determination result in step 202 is negative, the flow returns to step 200 and a waiting state is maintained. In FIG. 8, the S1 state is maintained.

On the other hand, when it is determined in step 200 that the pre-operation state detection signal has been received, the control circuit 60 switches in step 206 the wireless receiving circuit 62 from the low-frequency intermittent reception state to the high-frequency intermittent reception state or the continuous reception state. Specifically, the control circuit 60 transmits a control signal to the electric power supply circuit 68 of the wireless receiving circuit 62. Then, the wireless receiving circuit 62 decreases the interval of the electric power supply to the wireless module 64 and the decoding circuit 66 to thereby switch to the high-frequency intermittent reception state or the continuous reception state where the electric power supply is continuously performed, in accordance with the control signal. In FIG. 8, the state transitions from S1 to S2.

In step 208, the control circuit 60 determines whether or not the activation signal (a signal capable of allowing the electric power supply to the core circuit 18) by the operation of the operation portion 28 has been received from the remote control unit 14. When a determination result in step 208 is negative, the flow proceeds to step 210, where the control circuit 60 determines whether or not a predetermined time has elapsed after it has been switched to the high-frequency intermittent reception state or the continuous reception state.

When it is determined in step 210 that the predetermined time has not elapsed, the flow returns to step 208 and a waiting state is maintained.

When the control circuit 60 has determined in step 208 that the activation signal has been received from the remote control unit 14, the flow proceeds to step 214, where the control circuit 60 transmits the activation signal to the electric power supply circuit 46 to thereby activate the entire portions of the core circuit 18. In this way, the electric power supply to the entire portions of the core circuit 18 is started, and the state transitions from S2 directly to S3 in FIG. 8.

On the other hand, when the determination result in step 202 is positive, the core circuit 18 is activated in step 204, similar to step 214, and the wireless receiving circuit 62 is switched to the high-frequency intermittent reception state or the continuous reception state, similar to step 206. In this way, the state transitions from S1 directly to S3 in FIG. 8.

After step 214, the flow proceeds to step 216, where it waits for receipt of the stop signal. When the control circuit 60 has determined in step 214 that the stop signal has been received from the remote control unit 14, the control circuit 60 outputs in step 218 a stop control signal to the electric power supply circuit 46 of the core circuit 18. With the stop control signal, the electric power supply circuit 46 stops the electric power supply to the core circuit 18. Moreover, the control circuit 60 transmits a control signal to the electric power supply circuit 68 of the wireless receiving circuit 62 so that the wireless receiving circuit 62 is switched to the low-frequency intermittent reception state. In this way, the wireless receiving circuit 62 is switched to the low-frequency intermittent reception state by increasing the interval of the electric power supply to the wireless module 64 and the decoding circuit 66. In FIG. 8, the state transitions to S3 to S1.

In the present embodiment, the electronic device 58 transitions to a stop state in step 218, and thereafter, the flow returns to step 200 after elapse of a predetermined time (a short time of about 1 to 2 seconds) in step 220. This is because it is highly likely that the acceleration detected immediately after the stop signal is transmitted from the remote control unit 14 is not based on the movement detected when an operator starts to operate the remote control unit 14, but based on the movement detected upon completion of the remote control operation. Moreover, it may be configured such that the pre-operation state detection signal is not transmitted immediately after the stop signal has been transmitted from the remote control unit 14, and in such a case, the processing of step 220 may be omitted.

Meanwhile, when a state, where the activation signal by the button operation of the operation portion 28 is not received, continues for a predetermined time (for example, 20 seconds) in the preliminary activation state S2, a determination result in step 210 is negative and the flow proceeds to step 212. In step 212, the control circuit 60 transmits a control signal to the electric power supply circuit 68 of the wireless receiving circuit 62 to thereby switch the wireless receiving circuit 62 to the low-frequency intermittent reception state. In this way, the state returns from S2 to S1 in FIG. 8.

As described above, according to the present embodiment, the remote control unit 14 detects an acceleration to thereby detect the occurrence of the pre-operation state, so that the wireless receiving circuit 62 of the electronic device 58 is preliminarily switched to the high-frequency intermittent reception state or the continuous reception state before the operation portion 28 is operated. Therefore, it is possible to reduce a time required until the core circuit 18 starts operating after the operation portion 28 has been actually operated by an operator.

Although it is possible to suppress the power consumption of the wireless receiving circuit 62 as the reception frequency is low, the response time thereof after receipt of the remote control signal might increase if the reception frequency is low. However, as described above, since the wireless receiving circuit is switched to the high-frequency intermittent reception state (or the continuous reception state) before the operation portion 28 is operated, the operator of the operation portion 28 may have a feeling that the electronic device 58 is immediately activated, and thus, good operability can be provided. Therefore, it is possible to provide good operability while taking advantage of power saving effect.

Figure 9:
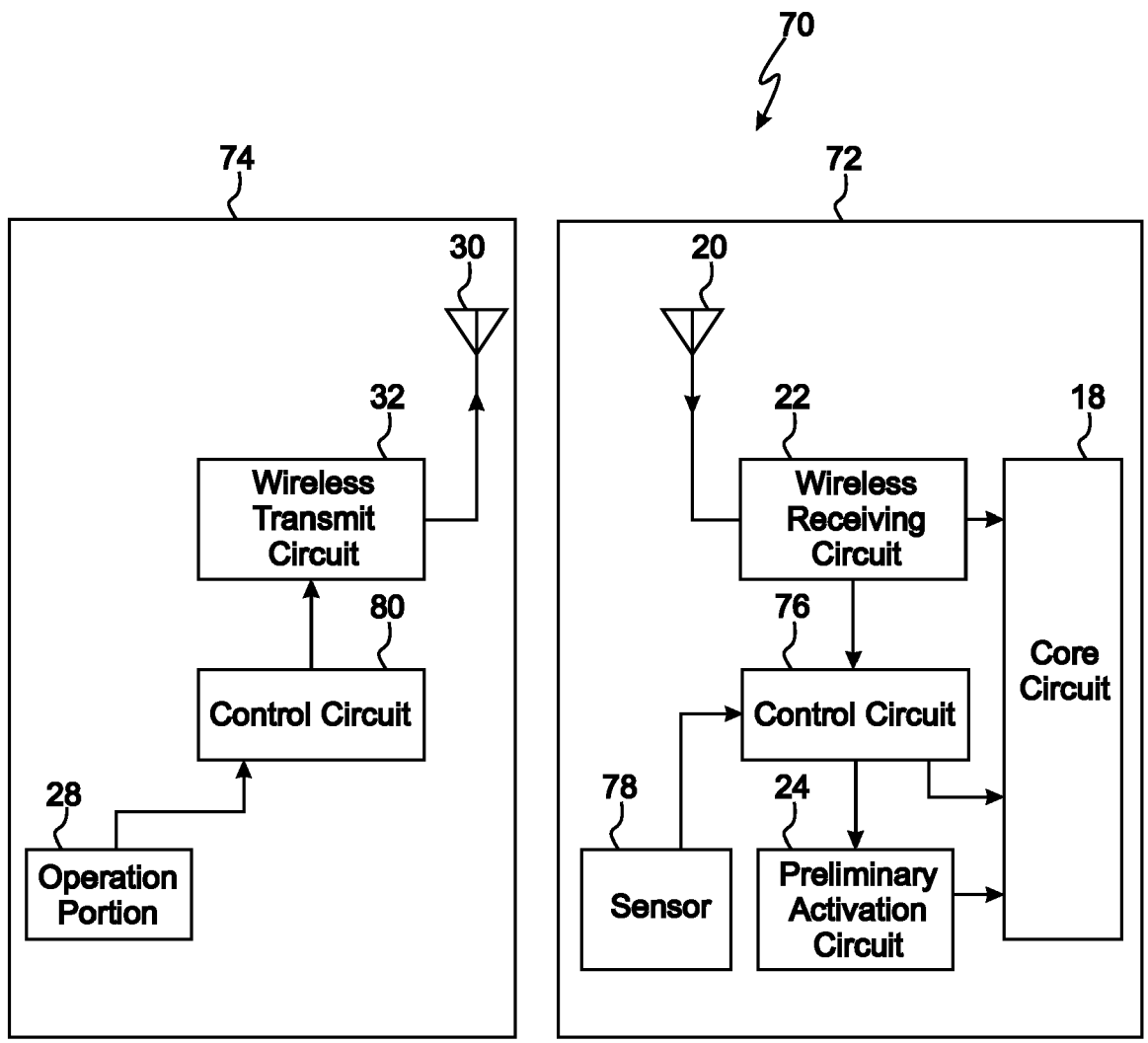
FIG. 9 is a configuration diagram of a remote control system according to a third embodiment.

FIG. 9 is a configuration diagram of a remote control system 70 according to a third embodiment. The remote control system 70 includes an electronic device 72 and a remote control unit 74. The remote control system 70 according to the present embodiment has a configuration in which a sensor 78 is provided to the electronic device, while the acceleration detector 34 is removed from the remote control unit of the first embodiment. A detailed description of the configuration of the remote control system 70 will be provided below. In FIG. 9, components having the same function as those in FIG. 1 will be denoted by the same reference numerals as used in FIG. 1, and therefore, redundant descriptions thereof will be omitted.

The electronic device 72 of the present embodiment is configured to operate by being remotely controlled by a remote control signal transmitted from the remote control unit 74, similar to the first embodiment. The electronic device 72 of the present embodiment is configured to include a control circuit 76, a core circuit 18, an antenna 20, a wireless receiving circuit 22, a preliminary activation circuit 24, and a sensor 78.

The sensor 78 is configured to detect a predetermined physical quantity to thereby detect the occurrence of a pre-operation state where the remote control unit 74 is expected to be operated. For example, the sensor 78 may be able to detect sound generated when an operator takes hold of the remote control unit 74 or to measure a reflection intensity of an ultrasonic wave emitted from the sensor 78 and reflected from the operator to thereby detect the movement of the remote control unit 74.

Moreover, the sensor 78 may not be a sensor capable of detecting the movement of the remote control unit 74 but may be a sensor capable of detecting the presence of an operator around the electronic device 72. For example, when the sensor 78 is a sensor capable of detecting brightness of an area around the electronic device 72, the occurrence of the pre-operation state can be detected by detecting an increase in the brightness of the area, such as by lighting of an ambient illumination of the electronic device 72. Moreover, the presence of an operator around the electronic device 72 may be detected by measuring a reflection intensity of an ultrasonic wave emitted from a sensor and reflected from the operator. Furthermore, the number of types of the detected physical quantity is not limited to one but may be two or more.

Upon detecting the occurrence of the pre-operation state, the sensor 78 outputs a pre-operation state detection signal to the control circuit 76.

The control circuit 76 of the electronic device 72 controls the overall operation of the electronic device 72. The control circuit 76 is configured to operate the core circuit 18 in accordance with a remote control signal transmitted from the remote control unit 74 and input thereto via the antenna 20 and the wireless receiving circuit 22 and operate the preliminary activation circuit 24 in accordance with the pre-operation state detection signal output from the sensor 78. The control circuit 76 may be a microcomputer configured by a CPU, a RAM, a ROM, and the like, or may be a digital circuit or the like.

Moreover, the remote control unit 74 of the present embodiment includes a control circuit 80, an operation portion 28, an antenna 30, and a wireless transmitting circuit 32. When the operation portion 28 is operated by an operator and a signal corresponding to a button operation is input to the control circuit 80, the control circuit 80 generates a remote control signal corresponding to the button operation from the input signal and outputs the remote control signal to the wireless transmitting circuit 32. In the present embodiment, since the acceleration detector 34 is not provided in the remote control unit 74, the remote control signal by the detection of the acceleration detector is not transmitted.

A description of the operation of the present embodiment will be provided below. The operation of the present embodiment is the same as that of the first embodiment, except that the occurrence of the pre-operation state is detected by the sensor 78 of the electronic device 72, differently from the first embodiment.

Specifically, although in the first embodiment, it is determined in step 100 of FIG. 3 whether or not the pre-operation state detection signal has been received from the remote control unit 74, in the present embodiment, it is determined whether or not the pre-operation state detection signal has been output from the sensor 78. Other operations are the same as those of the first embodiment, and the electronic device has the same state transition as shown in FIG. 4.

With such a configuration, it is possible to provide the same effect as provided by the first embodiment.

Figure 10:
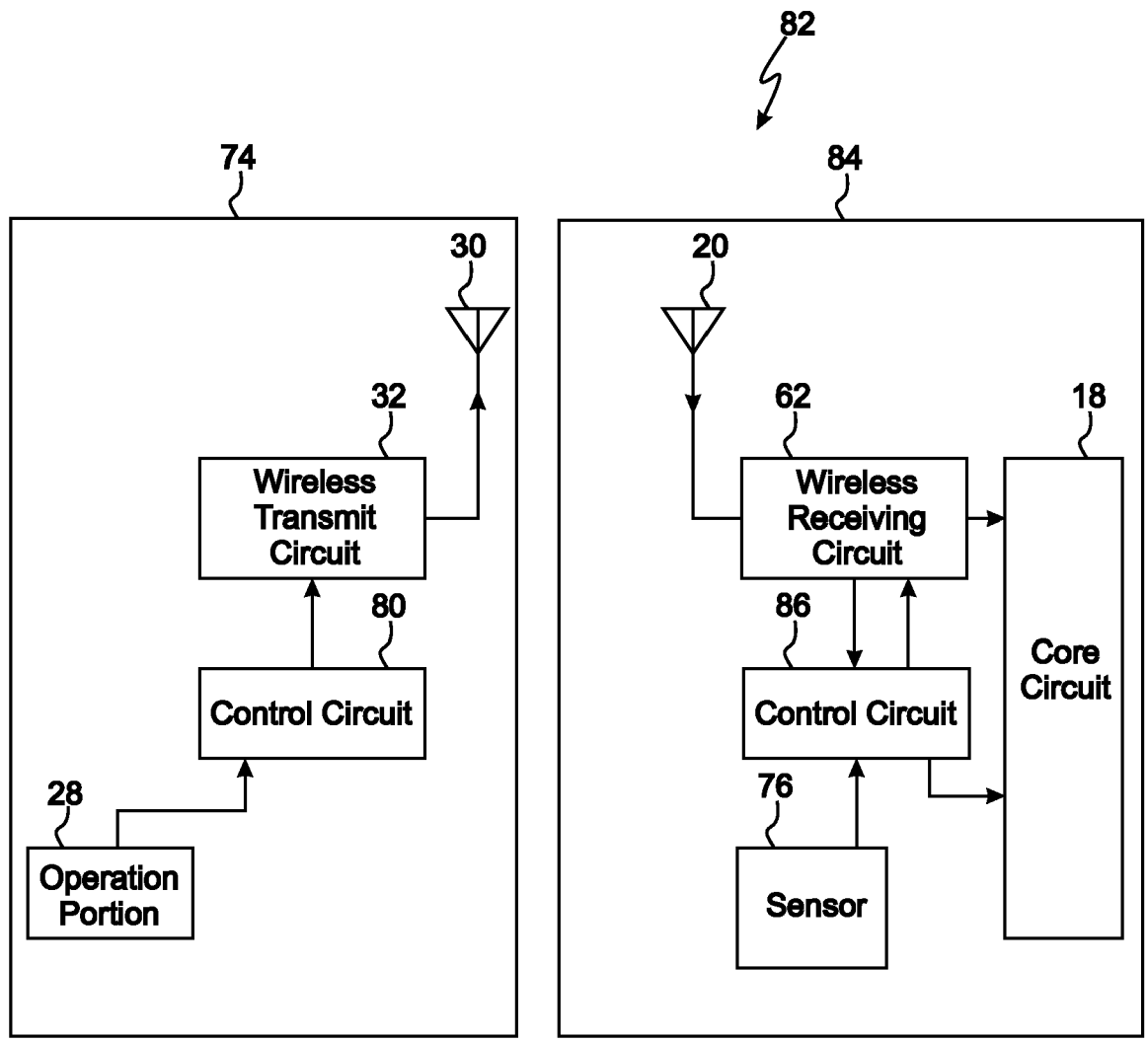
FIG. 10 is a configuration diagram of a remote control system according to a fourth embodiment.

FIG. 10 is a configuration diagram of a remote control system 82 according to a fourth embodiment. The remote control system 82 includes an electronic device 84 and a remote control unit 74 having the same configuration as the third embodiment. The remote control system 82 according to the present embodiment has a configuration in which a sensor 78 is provided to the electronic device, while the acceleration detector 34 is removed from the remote control unit of the second embodiment. A detailed description of the configuration of the remote control system 82 will be provided below. In FIG. 10, components having the same function as those in FIGS. 1 and 9 will be denoted by the same reference numerals as used in FIGS. 1 and 9, and therefore, redundant descriptions thereof will be omitted.

The electronic device 84 of the present embodiment is configured to operate by being remotely controlled by a remote control signal transmitted from the remote control unit 74, similar to the second embodiment. The electronic device 84 of the present embodiment is configured to include a control circuit 86, a core circuit 18, an antenna 20, a wireless receiving circuit 62, and a sensor 78.

The sensor 78 is configured to detect a predetermined physical quantity to thereby detect the occurrence of a pre-operation state where the remote control unit 74 is expected to be operated, similar to the first embodiment.

The control circuit 86 of the electronic device 84 controls the overall operation of the electronic device 84. The control circuit 86 is configured to operate the core circuit 18 in accordance with a remote control signal transmitted from the remote control unit 74 and input thereto via the antenna 20 and the wireless receiving circuit 62 and switch the reception state of the wireless receiving circuit 62 in accordance with the pre-operation state detection signal output from the sensor 78. The control circuit 76 may be a microcomputer configured by a CPU, a RAM, a ROM, and the like, or may be a digital circuit or the like.

A description of the operation of the present embodiment will be provided below. The operation of the present embodiment is the same as that of the second embodiment, except that the occurrence of the pre-operation state is detected by the sensor 78 of the electronic device 84, differently from the second embodiment.

Specifically, although in the second embodiment, it is determined in step 200 of FIG. 7 whether or not the pre-operation state detection signal has been received from the remote control unit 74, in the present embodiment, it is determined whether or not the pre-operation state detection signal has been output from the sensor 78. Other operations are the same as those of the second embodiment, and the electronic device has the same state transition as shown in FIG. 8.

With such a configuration, it is possible to provide the same effect as provided by the second embodiment.

Figure 11:
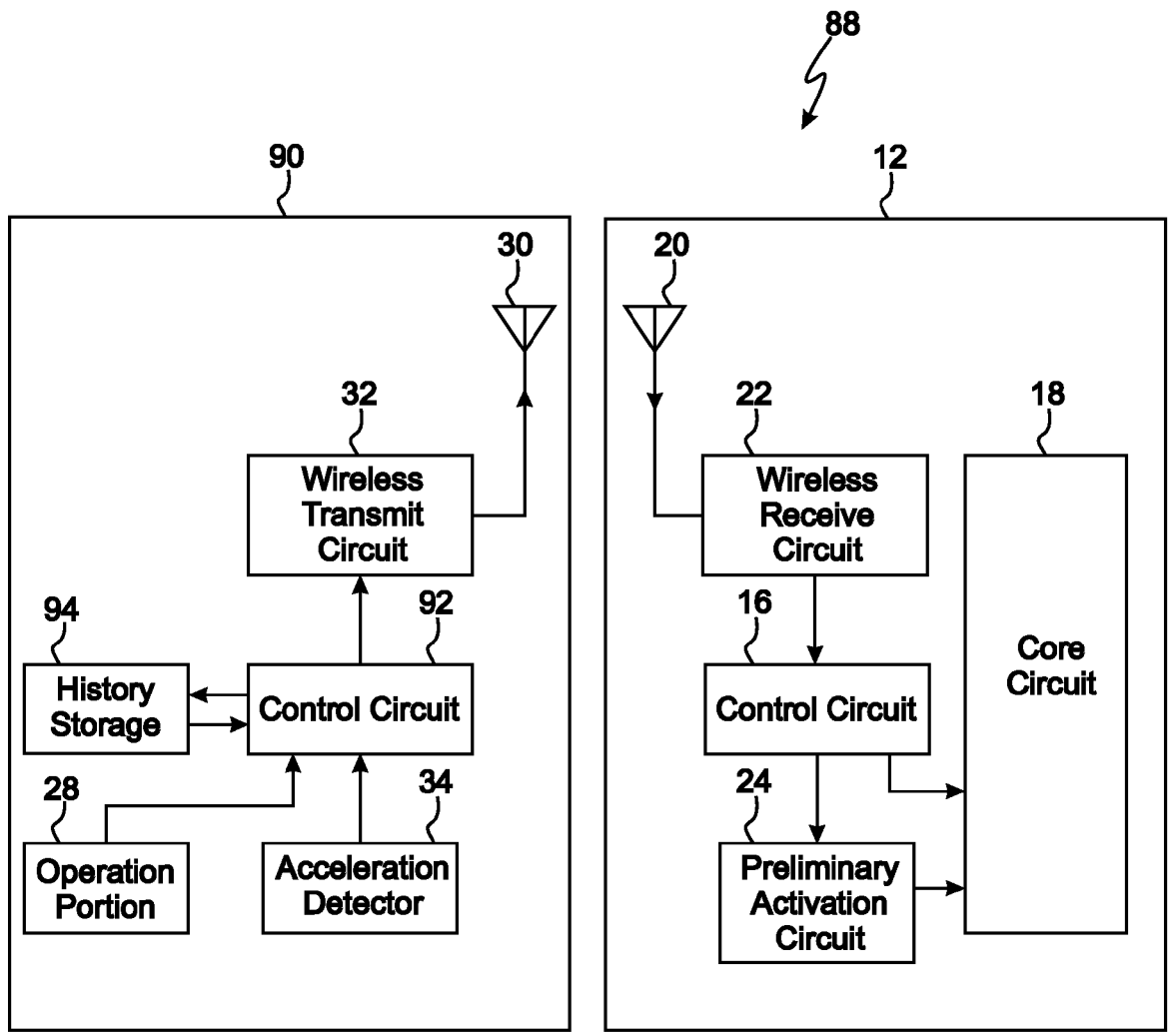
FIG. 11 is a configuration diagram of a remote control system according to a fifth embodiment.

FIG. 11 is a configuration diagram of a remote control system 88 according to a fifth embodiment. The remote control system 88 includes an electronic device 12 and a remote control unit 90. The electronic device 12 of the present embodiment has the same configuration as the electronic device 12 of the first embodiment, and the remote control unit 90 of the present embodiment has a configuration in which a history storage portion 94 is additionally provided to the remote control unit 14 of the first embodiment. A detailed description of the configuration of the remote control system 88 according to the present embodiment will be provided below. In FIG. 11, components having the same function as those in FIG. 1 will be denoted by the same reference numerals as used in FIG. 1, and therefore, redundant descriptions thereof will be omitted.

The remote control unit 90 is configured to include a control circuit 92, an operation portion 28, an antenna 30, a wireless transmitting circuit 32, an acceleration detector 34, and a history storage portion 94.

The acceleration detector 34 of the present embodiment is configured to output a signal (hereinafter, referred to as an acceleration detection signal) having different voltage values depending on a magnitude of the detected acceleration to the control circuit 92.

Upon receipt of the acceleration detection signal from the acceleration detector 34, the control circuit 92 is configured to store, as history information, in the history storage portion 94, a voltage value of the acceleration detection signal output from the acceleration detector 34 and information as to whether or not the operation portion 28 (in this embodiment, the power button) has been operated, in a correlated manner. The history storage portion 94 is storage circuit configured by a flash memory or a SDRAM. Furthermore, the control circuit 92 is configured to compare a threshold generated from the history information stored in the history storage portion 94 with the acceleration detection signal, generate a remote control signal (hereinafter, referred to as a pre-operation state detection signal) capable of informing detection of the acceleration when it was able to obtain a predetermined comparison result, and output the generated pre-operation state detection signal to the wireless transmitting circuit 32. The wireless transmitting circuit 32 decodes the input remote control signal and transmits the decoded remote control signal to the electronic device 12 via the antenna 30. That is, in the present embodiment, upon receipt of the signal capable of informing the detection of the acceleration from the acceleration detector 34, the control circuit 92 is configured to not always transmit the pre-operation state detection signal but to determine whether or not the pre-operation state detection signal is to be transmitted based on the history information stored in the history storage portion 94 and transmit the pre-operation state detection signal when it is determined to be transmitted.

The control circuit 92 may be a microcomputer configured by a CPU, a RAM, a ROM, and the like, or may be a digital circuit or the like. In the present embodiment, the control circuit 16 will be described as being configured by a microcomputer. A program executed by the control circuit 92 is stored in storage circuit such as a ROM, and the CPU executes the program.

A description of the operation of the present embodiment will be provided below. Since the procedure of the processing in the electronic device 12 is the same as the first embodiment, a description of only the procedure of the processing in the remote control unit 90 will be provided below. A description of an operation of the remote control system 88 according to the present embodiment will be provided based on the following assumption, for the simplicity's sake, similar to the above-described embodiment. First, only the power button is operated among the plurality of buttons of the operation portion 28. Second, the remote control signal transmitted upon operation of the operation portion 28 includes only two signals: an activation signal capable of activating, by turning on, the core circuit 18 of the electronic device 12; and a stop signal capable of stopping, by turning off, the core circuit 18.

Figure 12:
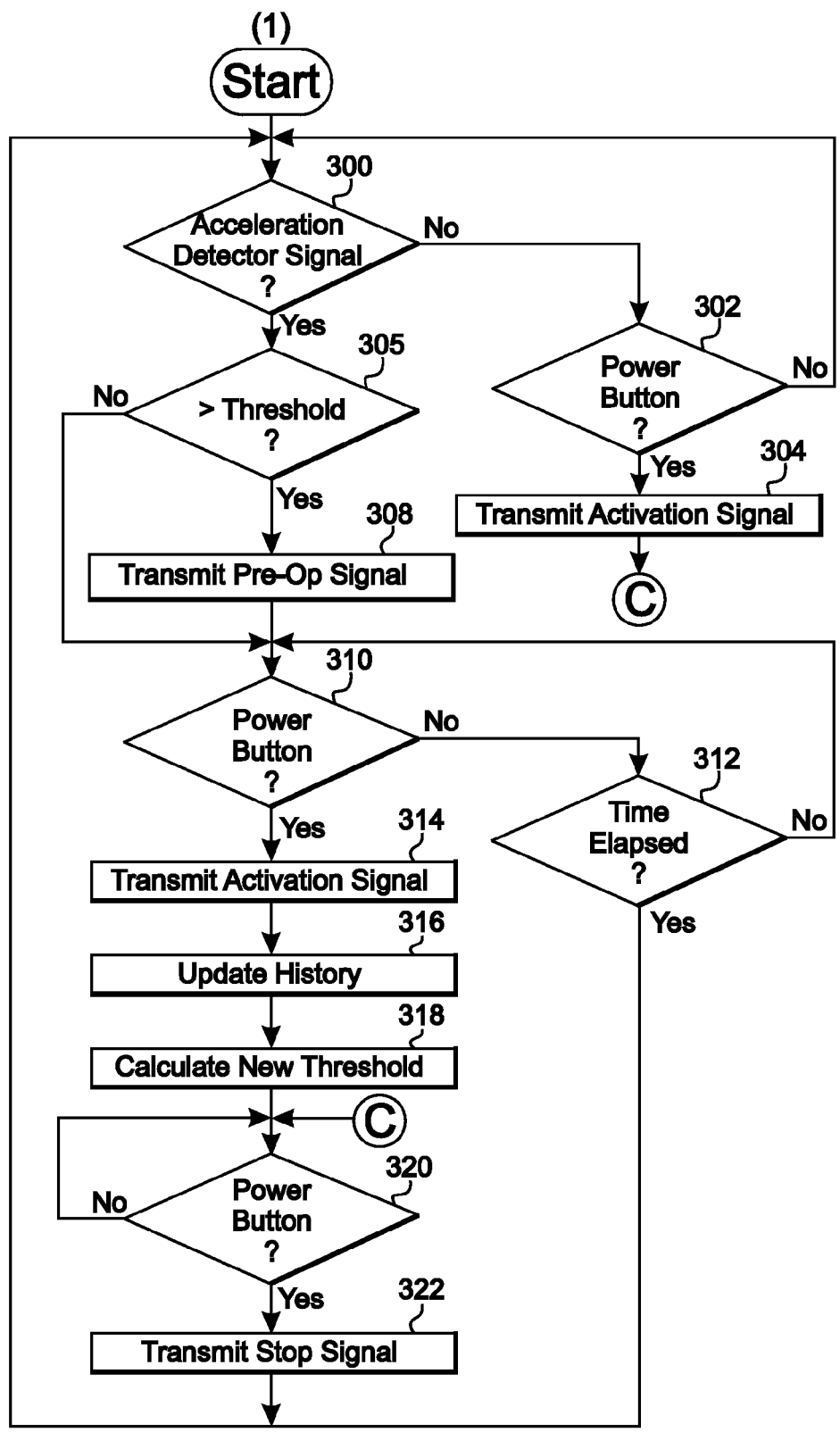
FIG. 12 is a flow chart illustrating a procedure of a process performed by a control circuit of a remote control unit according to the fifth embodiment.

FIG. 12 is a flow chart illustrating a procedure of a process performed by the control circuit 92 of the remote control unit 90.

In step 300, the control circuit 92 determines whether or not the acceleration detection signal has been received. When a determination result in step 300 is negative, the control circuit 92 determines in step 302 whether or not the power button of the operation portion 28 of the remote control unit 90 has been operated. When a determination result in step 302 is negative, the flow returns to step 300 and a waiting state is maintained.

On the other hand, when it is determined in step 300 that the acceleration detection signal has been received, the control circuit 92 determines in step 306 whether or not the voltage value of the acceleration detection signal is larger than a threshold. Here, the threshold is a threshold value for determining whether or not the pre-operation state is to be transmitted, and in the present embodiment, the latest threshold value calculated when a previous acceleration detection signal was received is used.

When it is determined in step 306 that the voltage value of the acceleration detection signal is larger than the TR, the control circuit 92 generates in step 308 the pre-operation state detection signal and transmits the pre-operation state detection signal to the electronic device 12 via the wireless transmitting circuit 32, and the flow proceeds to step 310. On the other hand, when the control circuit 92 has determined in step 306 that the voltage value of the acceleration detection signal is not larger than the threshold, the flow proceeds to step 310 while skipping step 308.

In step 310, the control circuit 92 determines whether or not the power button has been operated. When a determination result in step 310 is negative, the flow proceeds to step 312, where the control circuit 92 determines whether or not a predetermined time has elapsed after the acceleration detection signal has been received. When it is determined in step 312 that the predetermined time has not elapsed, the flow returns to step 310 and a waiting state is maintained. On the other hand, when it is determined in step 312 that the predetermined time has elapsed, the flow returns to step 300 and a waiting state is maintained. For example, when the remote control unit 90 has been moved not due to a reason that an operator has moved the remote control unit 90 in order operate the remote control unit 90, but due to other reasons that unexpected vibration is transmitted to the remote control unit 90, a determination result in steps 300 and 312 will be positive.

On the other hand, when the control circuit 92 has determined that the power button has been pressed within the predetermined time after the acceleration detection signal has been received, the flow proceeds to step 314, where the activation signal is transmitted. Subsequently, the control circuit 92 updates in step 316 the history information stored in the history storage portion 94. In the present embodiment, a time range where it is able to calculate the voltage value of the acceleration detection signal is divided into a plurality of time zones at a predetermined interval, and the number (the number of operation events) of operations made to the operation portion 28 after the acceleration detection signal has been received is counted as a cumulative value for each of the time zone (class) and stored as the history information. Therefore, the control circuit 92 increases the cumulative value corresponding to a class, to which the voltage value of the recent acceleration detection signal belongs, by one, to thereby update the history storage portion 94.

In step 318, the control circuit 92 calculates a new threshold from the updated history information. When the acceleration is extremely small, this is often a case where the acceleration is detected based on vibration not associated with the pre-operation state of an operator. Therefore, when an extremely small acceleration detection signal is received, the threshold is calculated such that the pre-operation state detection signal is not transmitted. For example, a median value of a voltage value of a class having the smallest voltage value among classes having a cumulative value of one or more may be used as the threshold. Alternatively, a boundary value between a voltage value of a class having a cumulative value of less than a predetermined value and a voltage value of a class having a cumulative value of the predetermined value or more may be used as the threshold. Furthermore, a median value of a voltage value of a class having a voltage value smaller, by a predetermined voltage value, than that of a class having the largest frequency may be used as the threshold. The threshold calculated in this step is used for making a determination as to whether or not the pre-operation state detection signal is to be transmitted upon receipt of a subsequent acceleration detection signal. After the newest threshold is calculated, the flow proceeds to step 320.

On the other hand, when the power button is pressed in a state where the acceleration detection signal has not been received, a determination result in step 300 will be negative while a determination result in step 302 will be positive. Therefore, in step 304, the control circuit 92 transmits the activation signal, and the flow proceeds to step 320.

In step 320, the control circuit 92 determines whether or not the power button has been operated. When the control circuit 92 has determined that the power button has been operated, the control circuit 92 transmits the stop signal in step 322, and the flow returns to step 300.

As described above, the history storage portion 94 has stored therein, as the history information, the voltage value of the acceleration detection signal output from the acceleration detector 34 and information as to whether or not the operation portion 28 (in this embodiment, the power button) has been operated, in a correlated manner, so that a determination can be made as to whether or not the pre-operation state detection signal is to be transmitted based on the threshold calculated based on the history information. Therefore, it is possible to increase the precision of the preliminary activation. For example, even when the acceleration detector 34 has detected vibration not associated with an operator, the pre-operation state detection signal is not transmitted. Therefore, it is possible to prevent unnecessary preliminary activation and to thus provide good operability while suppressing the power consumption.

In the present embodiment, although the threshold is calculated such that the pre-operation state detection signal is not transmitted when the acceleration detection signal is extremely small, the present invention is not limited to this. The threshold may be calculated such that the pre-operation state detection signal is not transmitted when the acceleration detection signal is extremely large. For example, when an operator has mistakenly touched the remote control unit to be dropped on a floor or the like, there is a high possibility of detecting an extremely large acceleration. Therefore, another threshold may be calculated such that the pre-operation state detection signal is not transmitted even when the acceleration detection signal is extremely large, so that a determination can be made as to whether or not the pre-operation state detection signal is to be transmitted by comparing the input acceleration detection signal with the two calculated thresholds.

Moreover, in the present embodiment, although a description has been made for a case where a time range where it is able to calculate the voltage value of the acceleration detection signal is divided into a plurality of time zones at a predetermined interval, and the number (the number of operation events) of operations made to the operation portion 28 is counted as a cumulative value for each of the time zone (class) and stored as the history information, thereby calculating the threshold, the present invention is not limited to this. For example, both the number of operation events and the number of non-operation events may be stored (in this case, a process of updating the history information and calculating the new threshold is performed even after step 312 of FIG. 12), and a probability of the operation event may be calculated for each class, thereby calculating the threshold from the probability. For example, a boundary value between a voltage value of a class having a probability less than a predetermined value and a voltage value of a class having a probability of the predetermined value or more may be used as the threshold. Even when the threshold is calculated in such a manner, it is possible to provide the same effect as described above.

Moreover, in the present embodiment, although a description has been made for a case where the history storage portion 94 is provided in the remote control unit according to the first embodiment, the present invention is not limited to this, but the history storage portion 94 may be provided in the remote control unit according to the second embodiment. Alternatively, the history storage portion 94 may be provided in the electronic device according to the third or fourth embodiment.

When the history storage portion 94 is provided in the electronic device according to the third or fourth embodiment, the magnitude (voltage value) of the pre-operation state detection signal output from the sensor 78 to the control circuit 76 or the control circuit 86 is adjusted so as to correspond to the magnitude of the physical quantity detected by the sensor 78. Moreover, the control circuit 76 or the control circuit 86 is configured to store, as the history information, in the history storage portion 94, the magnitude of the pre-operation state detection signal and the presence of the activation signal received from the remote control unit 74, in a correlated manner. Furthermore, the control circuit 76 or the control circuit 86 is configured to calculate the threshold from the history information stored in the history storage portion 94 in the above-described manner, compare the pre-operation state detection signal with the threshold upon receipt of the pre-operation state detection signal, and make a determination as to whether or not a control signal for causing the preliminary activation circuit 24 to output the activation signal is to be transmitted, or as to whether or not the reception state of the wireless receiving circuit 62 is to be changed. Even with such a configuration, it is possible to provide the same effect as described above.

Furthermore, detection circuit for detecting the pre-operation state may be provided in the remote control unit, and the history storage portion may be provided in the electronic device. In such a case, the pre-operation state detection signal transmitted from the remote control unit to the electronic device is configured to become a signal capable of representing the magnitude of the acceleration detection signal detected by the acceleration detector 34. Even with such a configuration, it is possible to provide the same effect as described above.

In addition, in calculation of the threshold, the threshold may be updated whenever the acceleration detection signal is received, and the threshold may be updated every predetermined number of receipts.

In the first to fifth embodiments, although the electronic device has been described as being a consumer electronic device, such as a television, having the video display portion 44, the present invention is not limited to this. For example, the electronic device may be an electronic device having the function of a HDD (hard disk drive) recorder or a DVD recorder, in addition to the television function, or may be an electronic device solely having the function of a HDD (DVD) recorder.

Figure 13:
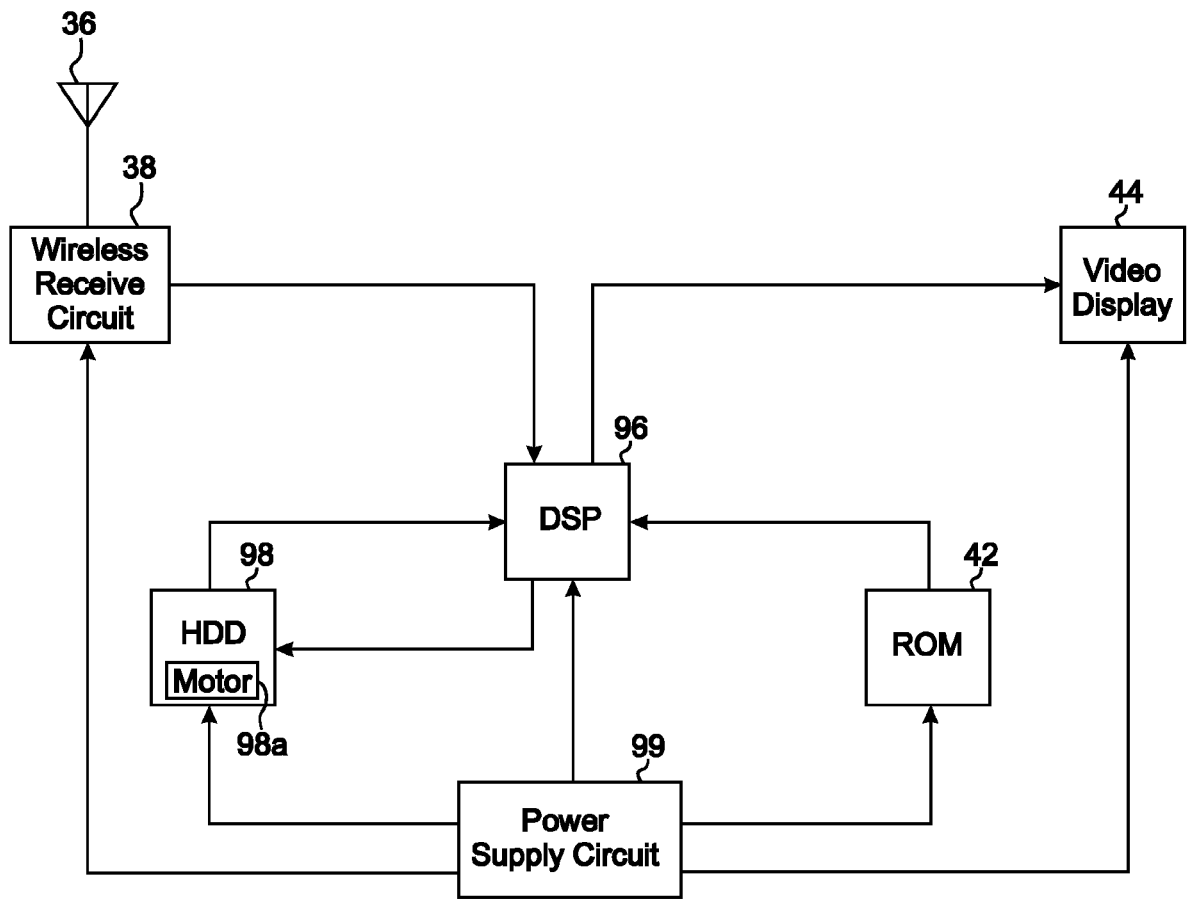
FIG. 13 is a schematic configuration diagram of a core circuit of an electronic device having a television and HDD recorder function according to a sixth embodiment.

In the present embodiment, a description of a modification of the core circuit 18 of the electronic device 12 according to the first embodiment will be provided. FIG. 13 is a schematic configuration diagram of a core circuit of an electronic device having a television and HDD recorder function. As illustrated in the drawing figure, the core circuit is configured to include an antenna 36, a wireless receiving circuit 38, a video display portion 44, a ROM 42, a digital signal processing circuit 96, an HDD 98, and an electric power supply circuit 99. The antenna 36, the wireless receiving circuit 38, the video display portion 44, and the ROM 42 are the same as those provided in the core circuit 18 according to the first embodiment. The digital signal processing circuit 96 according to the present embodiment is connected to the wireless receiving circuit 38, the video display portion 44, the HDD 98, and the ROM 42.

Upon receipt of the decoded digital signal from the wireless receiving circuit 38, the digital signal processing circuit 96 applies predetermined signal processing to the digital signal to thereby generate a video signal so as to be displayed by the video display portion 44. Moreover, upon receipt of the recording signal read from the HDD 98, the digital signal processing circuit 40 applies predetermined signal processing to the recording signal to thereby generate a video signal so as to be displayed by the video display portion 44. Furthermore, when the digital signal decoded by the wireless receiving circuit 38 is to be recorded on the HDD 98, the digital signal processing circuit 40 applies predetermined signal processing to the digital signal decoded by the wireless receiving circuit 38 to thereby generate a recording signal in compliance with a recording format of the HDD 98.

The digital signal processing circuit 96 is provided with a processing portion for executing various signal processing described above, a processor, and a RAM. A program stored in the ROM 42 is loaded to the RAM upon activation of the digital signal processing circuit 96, so that the program can be executed by the processor.

The HDD 98 is provided with a motor 98a, and data recording processing or data reading processing is performed with the rotation of the motor 98a.

The electric power supply circuit 99 is configured to supply electric power to each portion of the core circuit 18 in accordance with signals input from the control circuit 16 or the preliminary activation circuit 24. Upon receipt of the activation signal from the preliminary activation circuit 24, the electric power supply circuit 99 starts the electric power supply to the digital signal processing circuit 96 to thereby activate the digital signal processing circuit 96 while starting the electric power supply to the motor 98a provided in the HDD 98 to thereby activate the motor 98a. The motor 98a often requires a long stabilization time until its rotation is stabilized. Therefore, by preliminarily activating the motor, it is possible to further reduce a time required until the electronic device starts its operation after the operation portion 28 is operated.

Moreover, when the digital signal processing circuit 96 and the HDD 98 are preliminarily activated as described above, instead of performing the processing of step 104 according to the first embodiment, the electric power supply to the digital signal processing circuit 96 and the motor 98a of the HDD 98 is started so that they are activated. The same processing is performed in the third embodiment.

Moreover, in the present embodiment, although a description has been made for an example where both the digital signal processing circuit 96 and the motor 98a of the HDD 98 are activated, it is possible to provide the time reducing effect even when only the digital signal processing circuit 96 is activated.

In the present embodiment, although a description has been given by way of an example of an electronic device mounting a HDD recorder function, the same operation and effect can be provided by an electronic device mounting a DVD recorder function. Moreover, the same operation and effect can be provided by an electronic device mounting a read-only DVD drive without a recording function.

Furthermore, the electronic device may be provided with an output terminal connected to an external video display unit instead of the video display portion 44. In such an electronic device, similar to the embodiment described above, by preliminarily putting the digital signal processing circuit configured to generate a video signal to be output to the external video display unit, into the preliminary activation state, it is possible to reduce a time required until videos are displayed on the external video display unit after the operation of the power button by the remote control unit.

In the first to sixth embodiments, although a description has been given by way of an example of a case where the wireless transmission path between the electronic device and the remote control unit is configured to be able to perform a uni-directional communication (in a signal direction from the remote control unit to the electronic device), the wireless transmission path may be configured to be able to perform a bi-directional communication.

For example, in the remote control system 10 according to the first embodiment, the wireless receiving circuit 22 of the electronic device 12 and the wireless transmitting circuit 32 of the remote control unit 14 are configured as a wireless transmitting/receiving circuit having a function of decoding signals input from an external source and decoding signals to be transmitted to an external destination. A description of an exemplary operation of the electronic device 12 and the remote control unit 14 having a configuration capable of performing such a bi-directional communication will be provided below. In the present embodiment, the electronic device 12 is configured to transmit a response signal when the pre-operation state detection signal has been normally received, and the remote control unit 14 is configured to retransmit the pre-operation state detection signal in response to the response signal.

Figure 14:
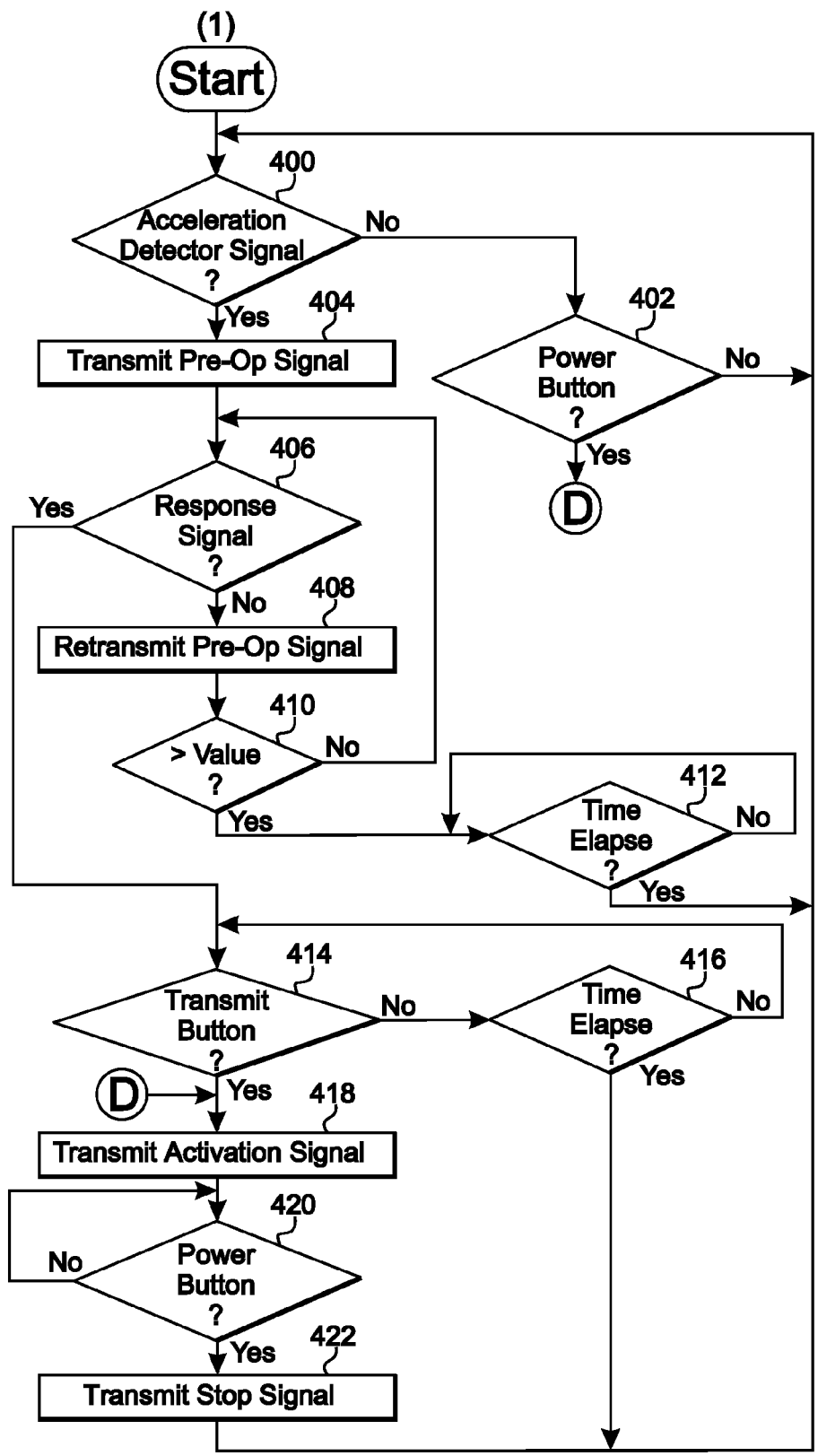
FIG. 14 is a flow chart illustrating a procedure of a process performed by a control circuit of a remote control unit according to a seventh embodiment.

FIG. 14 is a flow chart illustrating a procedure of a process performed by a control circuit 26 of the remote control unit 14 when it is configured to be able to perform a bi-directional communication with the same configuration as the first embodiment.

In step 400, the control circuit 26 of the remote control unit 14 determines whether or not the acceleration detection signal has been received. When a determination result in step 400 is negative, the control circuit 14 determines in step 402 whether or not the power button of the operation portion 28 of the remote control unit 14 has been operated. When a determination result in step 402 is negative, the flow returns to step 400 and a waiting state is maintained.

Moreover, when the control circuit 26 has determined in step 400 that the acceleration detection signal has been received, the control circuit 26 generates in step 404 the pre-operation state detection signal and transmits the generated pre-operation state detection signal to the electronic device 12 via the wireless transmitting circuit 32, and the flow proceeds to step 406.

In step 406, the control circuit 26 determines whether or not a response signal has been received from the electronic device 12 within a predetermined time after the pre-operation state detection signal has been transmitted. When a determination result in step 406 is negative, the flow proceeds to step 408, where the control circuit 26 retransmits the pre-operation state detection signal. Then, a determination is made in step 410 as to whether or not the number of re-transmission times exceeds a predetermined value, and the flow returns to step 406 when the number of re-transmission times has been determined as not exceeding the predetermined value.

On the other hand, when it is determine in step 410 that the number of re-transmission times has exceeded the predetermined value, the flow proceeds to step 412, where the control circuit 26 remains in a waiting state until a predetermined time elapses after the last pre-operation state detection signal has been transmitted, and thereafter, the flow returns to step 400.

That is, in the present embodiment, the pre-operation state detection signal is continuously retransmitted in steps 406 to 412 until the response signal is received. However, when the number of re-transmission times has exceeded the predetermined value, it is determined that the electronic device 12 is in an abnormal state, the re-transmission of the pre-operation state detection signal is suspended, and the transmission of the pre-operation state detection signal is interrupted for a predetermined time.

On the other hand, when the control circuit 26 has determined in step 406 that the response signal has been received from the electronic device 12 within the predetermined time, the flow proceeds to step 414. In step 414, the control circuit 26 determines whether or not the power button has been operated. When a determination result in step 414 is negative, the flow proceeds to step 416, where the control circuit 26 determines whether or not a predetermined time has elapsed after the acceleration detection signal has been received. When it is determined in step 416 that the predetermined time has not elapsed, the flow returns to step 414 and a waiting state is maintained. On the other hand, when it is determined in step 416 that the predetermined time has elapsed, the flow returns to step 400 and a waiting state is maintained.

On the other hand, when the control circuit 26 has determined that the power button has been pressed within the predetermined time after the acceleration detection signal has been received, the activation signal is transmitted in step 418, and the flow proceeds to step 420. Moreover, on the other hand, when the power button is pressed in a state where the acceleration detection signal has not been received, a determination result in step 400 will be negative while a determination result in step 402 will be positive. Therefore, in step 418, the control circuit 26 transmits the activation signal, and the flow proceeds to step 420.

In step 420, the control circuit 26 determines whether or not the power button has been operated. When the control circuit 26 has determined that the power button has been operated, the control circuit 26 transmits the stop signal in step 422, and the flow returns to step 400.

In the procedure of the processing in the electronic device 12, other operations are the same as those of the first embodiment, except that a step of transmitting the response signal is further provided as step 101 in a route of the flow chart illustrated in FIG. 3 according to the first embodiment, which is taken when a determination result in step 100 is positive (or after the digital signal processing circuit 40 has been activated in step 104).

In this way, in the present embodiment, since the transmission of the pre-operation state detection signal is controlled based on the response signal from the electronic device 12, it is possible to suppress the power consumption of the remote control unit 14 and suppress influence (interference) of the pre-operation state detection signal, which might be given to a device other than a corresponding electronic device 12. For example, when the electronic device 12 is a television, examples of the electronic device other than the television include a microwave oven, an audio device, and the like.

Moreover, in the present embodiment, although a description has been made for an example where the electronic device 12 transmits the response signal upon receipt of the pre-operation state detection signal, the present invention is not limited to this. For example, when it is able to normally perform a preliminary activation operation after the pre-operation state detection signal has been received, the electronic device 12 may be configured to transmit a normal response signal. On the other hand, when it is unable to perform the preliminary activation operation even when the pre-operation state detection signal is received, the electronic device 12 may be configured to transmit an abnormal response signal. Even in a case where the abnormal response signal is transmitted, the remote control unit 14 can be controlled in a manner similar to the case of the present embodiment where the response signal has not been received. That is, the pre-operation state detection signal is retransmitted, and the re-transmission is continued until the normal response signal is received but not until the number of re-transmission times has exceeded the predetermined value.

Furthermore, informing circuit may be provided for informing an operator of the occurrence of an abnormality when the number of re-transmission times has exceeded the predetermined value, or when the abnormal response signal has been received, so that the operator can be informed of the occurrence of the abnormality by the informing circuit (for example, an alarm lamp may be provided to the remote control unit 14 to light the lamp).

In addition, in the present embodiment, although a description has been made for an example where the remote control system 10 of the first embodiment is provided with a bi-directional communication function so that the transmission of the pre-operation state detection signal is controlled, the same configuration may be applied to the second, fifth or sixth embodiment.

Furthermore, the first embodiment and the second embodiment may be combined together, so that upon receipt of the pre-operation state detection signal, the digital signal processing circuit is preliminarily activated and the wireless receiving circuit is switched to the high-frequency intermittent reception state or the continuous reception state. Similarly, the third embodiment and the fourth embodiment may be combined together. Further, the function of the fifth embodiment or the function of the sixth embodiment may be added to such combinations.

What is claimed is:

1. An electronic device comprising:
a receiving circuit configured to receive remote control signals from a remote control device;
an electronic device body including a signal processor for processing input signals and configured to perform at least one of video processing and audio processing based on signals processed in the signal processor in accordance with the remote control signals received by the receiving circuit;
an activation circuit for initializing an electric power supply which powers the signal processor to activate the signal processor when a pre-operation state is detected in the remote control device;
a detection circuit for detecting the occurrence of the pre-operation state by detecting a predetermined physical quantity,
wherein the activation circuit performs the activation processing when the pre-operation state has been detected by the detection circuit;
a storage device for storing the detected physical quantity and information as to whether or not the control signal has been received from the remote control device in a correlated manner; and
a threshold calculation circuit for calculating, based on the contents stored in the storage device, a threshold of the physical quantity for determining whether or not the activation processing of the activation circuit is to be performed,
wherein the activation circuit performs the activation processing when the pre-operation state has been detected by the detection circuit and when the detected physical quantity is larger than the threshold.

2. The electronic device according to claim 1, wherein the activation circuit initializes the electric power supply to the signal processor to thereby activate the signal processor while initializing the electric power supply to a motor included in the electronic device body to thereby activate the motor, upon occurrence of the pre-operation state.

3. The electronic device according to claim 1, further comprising a stopping circuit for stopping the electric power supply initialized by the activation circuit when a state where the control signal has not been received from the remote control device after activation of the signal processing portion continues for a predetermined period of time.

4. A remote control system comprising:
a remote control device including
an operation circuit for being operated to transmit a control signal capable of remotely controlling an electronic device, and
a transmitting circuit for transmitting the control signal when the operation circuit is operated; and
an electronic device including a receiving circuit for receiving signals transmitted from the remote control device;

an electronic device body having a signal processing for processing input signals and configured to perform at least one of display processing and record processing based on signals processed in the signal processor in accordance with a control signal transmitted from the remote control device and received by the receiving circuit; and an activation circuit for starting electric power supply to the signal processor to thereby activate the signal processor when a pre-operation state where the remote control device is expected to be operated during stoppage of electric power supply to the electronic device body has occurred, wherein either one of the remote control device or the electronic device includes a detection circuit for detecting the occurrence of the pre-operation state by detecting a predetermined physical quantity, a storage circuit for storing the detected physical quantity and information as to whether or not the operation circuit has been operated in a correlated manner, and a threshold calculation circuit for calculating, based on the contents stored in the storage circuit, a threshold of the physical quantity for determining as to whether or not the activation processing of the activation circuit is to be performed, and wherein the activation circuit of the electronic device performs the activation processing when the pre-operation state has been detected by the detection circuit and when the detected physical quantity is larger than the threshold.

5. The remote control system according to claim 4, wherein the activation circuit of the electronic device starts the electric power supply to the signal processor to thereby activate the signal processor while starting electric power supply to a motor included in the electronic device body to thereby activate the motor, upon occurrence of the pre-operation state.

6. The remote control system according to claim 4, wherein the electronic device further includes a stop circuit for stopping the electric power supply started by the activation circuit when a state where the control signal has not been received from the remote control device after activation of the signal processor continues for a predetermined period of time.

7. A remote control system comprising:

a remote control device configured to generate remote control signals, detect a physical quantity indicative of a condition of the remote control device, calculate a threshold based on the detected physical quantities, and determine a pre-operation state when a detected physical quantity is greater than the threshold; and an electronic device configured to receive the remote control signals, the electronic device including a processor configured to perform signal processing responsive to the remote control signals, and an activation circuit configured to initialize an electric power supply to activate the processor prior to activating other circuits of the electronic device, upon occurrence of the pre-operation state.

8. The remote control system according to claim 7, wherein the activation circuit starts the electric power supply to the processor to thereby activate the processor while starting electric power supply to a motor included in the electronic device to thereby activate the motor, upon occurrence of the pre-operation state.

9. The remote control system according to claim 7, wherein the electronic device further includes a stop circuit for stopping the electric power supply started by the activation circuit when a state where a remote control signal has not been received from the remote control device after activation of the processor continues for a predetermined period of time.

10. The remote control system according to claim 7, wherein the detected physical quantities are stored in a memory.

11. The remote control system according to claim 7, wherein the detected physical quantities include acceleration, change in direction of gravity, incident light, brightness of light, temperature, geomagnetism, ambient sound, contact or movement.

* * * * *